US012473723B2

(12) United States Patent
Pasquesi

(10) Patent No.: US 12,473,723 B2
(45) Date of Patent: Nov. 18, 2025

(54) PIPE RODING GUIDE TOOL

(71) Applicant: John Pasquesi, Lake Forest, IL (US)

(72) Inventor: John Pasquesi, Lake Forest, IL (US)

( * ) Notice: Subject to any disclaimer, the term of this patent is extended or adjusted under 35 U.S.C. 154(b) by 377 days.

(21) Appl. No.: 18/105,834

(22) Filed: Feb. 4, 2023

(65) Prior Publication Data

US 2023/0250621 A1 Aug. 10, 2023

Related U.S. Application Data

(60) Provisional application No. 63/417,168, filed on Oct. 18, 2022, provisional application No. 63/401,863, filed on Aug. 29, 2022, provisional application No. 63/306,696, filed on Feb. 4, 2022.

(51) Int. Cl.
*E03C 1/302* (2006.01)
*B08B 9/043* (2006.01)

(52) U.S. Cl.
CPC .............. *E03C 1/302* (2013.01); *B08B 9/043* (2013.01)

(58) Field of Classification Search
CPC ................................ E03C 1/302; B08B 9/043
USPC ............................ 15/104.31, 104.33, 257.01
See application file for complete search history.

(56) References Cited

U.S. PATENT DOCUMENTS

| | | | | |
|---|---|---|---|---|
| 1,824,924 A | | 9/1931 | Paul et al. | |
| 1,910,768 A | | 5/1933 | Hotchkiss, Jr. | |
| 1,982,402 A | | 11/1934 | Shade | |
| 2,332,940 A | * | 10/1943 | Senke | B08B 9/08 15/160 |
| 2,973,537 A | | 3/1961 | Simpson | |
| 3,283,353 A | | 11/1966 | Kirk | |
| 4,272,860 A | * | 6/1981 | Hinton | E03C 1/302 254/134.3 FT |
| 4,364,140 A | | 12/1982 | Irwin | |
| 4,692,957 A | | 9/1987 | Kovacs | |
| 4,974,280 A | | 12/1990 | Ward | |
| 6,615,440 B1 | | 9/2003 | Williams | |
| 7,269,874 B2 | * | 9/2007 | Hung | B08B 9/045 15/104.095 |
| 2007/0089254 A1 | | 4/2007 | Alaine | |
| 2008/0083058 A1 | | 4/2008 | Heffner | |
| 2008/0244816 A1 | | 10/2008 | Babb et al. | |
| 2016/0325320 A1 | | 11/2016 | Oberto et al. | |
| 2017/0232484 A1 | | 8/2017 | Kehoe et al. | |

FOREIGN PATENT DOCUMENTS

WO 2013079799 A1 6/2013

OTHER PUBLICATIONS

Zoro Guide Hose, Polyethylene Plastic with Mfr. No. K400 WC32/24853, Mfr. No. K400 WC45/26998, Material Polyethylene Plastic retrieved from https://www.zoro.com/ridgid-guide-hose-polyethylene-plastic-26778/i/G3127241/; 3 pages.

* cited by examiner

*Primary Examiner* — Tom Rodgers
(74) *Attorney, Agent, or Firm* — Vedder Price P.C.

(57) ABSTRACT

A pipe rodding guide tool which directs a flexible cleaning rod or snake in a selected direction at a pipe junction or series of pipe junctions, wherein the pipe rodding guide tool comprises a rod for a user to hold and a deflector for directing the flexible cleaning rod or snake in the direction of the bend or deflector.

16 Claims, 26 Drawing Sheets

PIPE RODING GUIDE TOOL

CROSS REFERENCE TO OTHER APPLICATIONS

This application claims the benefit of a priority to U.S. Provisional Application Nos. 63/306,696, filed Feb. 4, 2022; 63/401,863, filed Aug. 29, 2022; and 63/417,168, filed Oct. 18, 2022, the contents of which are incorporated by reference.

FIELD OF THE DISCLOSURE

The present disclosure relates to an apparatus and method for navigating a flexible rod/snake through a pipe junction.

BACKGROUND OF THE DISCLOSURE

The cleaning of sewers, drains, pipe systems and other plumbing is often accomplished with the use of a cleaning rod, generally referred to in the industry as a “snake.” In order to be an effective cleaning tool, the snake must be flexible, yet rigid enough to pass from one end of a pipe/plumbing system to the other end and apply force to disrupt any blockages encountered.

Plumbing systems may include pipe junctions where multiple pipes come together. For example, these junctions may be angled (e.g., having a Y or T shape whereby one pipe splits into two at an obtuse or right angle in comparison to the initial pipe segment). Further still, some junctions may produce acute angles with respect to the initial pipe segment. These junctions may result in pipe shapes (and angles of travel) which can be difficult or impossible for flexible rods to navigate. For instance, a junction may be curved in such a way that a flexible snake favors following a particular direction, as is the case with a Y connection or reverse bend. This can pose a problem for the snake, as it cannot readily be directed down the branch that goes “against the curve.” Although many snakes are flexible, a snake may still continually pass over the desired pipe junction for a variety of reasons, including insufficient flexibility of the snake or due to the length of the pipe prohibiting the snake from bending.

In some situations, if the snake fails to enter the desired pipe junction, the snake will continue to travel along the pipe and potentially break through the pipe wall of the pipe system. Without the assistance of a guide tool, certain intrusive actions may be required in order to access the pipe, such as disassembly of the pipe system, which may inconvenience the owner of the property.

Prior art systems have attempted to address this problem in a variety of ways. One such device is disclosed in U.S. Pat. No. 2,973,537 and describes a plumbing apparatus comprising a flexible tube which encapsulates a snake and is connected to a pull line which is manually held by an operator. The operator can pull on the pull line to cause the flexible tube to curve the snake in the desired direction. However, this approach is not ideal and presents numerous disadvantages. First, the length of the device is limited because the tool fully encapsulates the snake and includes a pull line. Next, the enclosed portion of the device restricts the size and movement of the snake, creating friction that can render it difficult or impossible to fully insert a flexible snake. Further still, the interior of the tool may become clogged or dirtied in use and be difficult to clean, rendering the tool non-functional. As such, there exists a need for a guide tool which is sturdy enough to traverse a long length of pipe and which overcomes the other disadvantages of existing tools while still being capable of providing a bend to create a path for a snake at a pipe junction. The present disclosure provides for a removable guide tool which does not need to be present in the pipe while the snake clears obstructions. Specifically, the present disclosure is a pipe rodding guide tool which is meant to be inserted into a pipe to provide a path for a snake to enter a desired pipe junction. Once the snake has entered the desired pipe junction, a user can remove the pipe rodding guide tool and perform the work unencumbered by the pipe rodding guide tool.

SUMMARY OF THE DISCLOSURE

The present disclosure relates to a pipe rodding guide tool which directs a flexible rod/snake in a selected direction at a pipe junction, wherein the guide tool has a deflector at one end for directing the flexible rod/snake in the direction of the deflector.

BRIEF DESCRIPTION OF THE DRAWINGS

The following detailed description, given by way of example, but not intended to limit the disclosure solely to the specific embodiments described, may best be understood in conjunction with the accompanying drawings.

DETAILED DESCRIPTION OF THE DISCLOSURE

Figure 1:
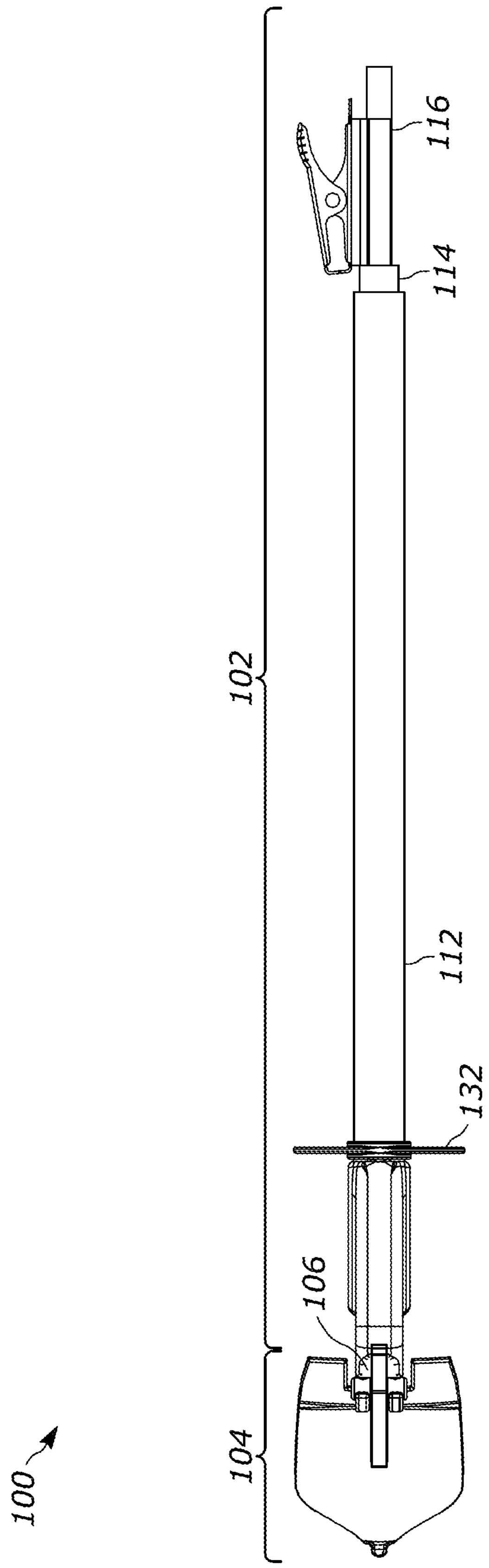
FIG. 1 shows a top view of a first embodiment of the pipe rodding guide tool.
Figure 2:
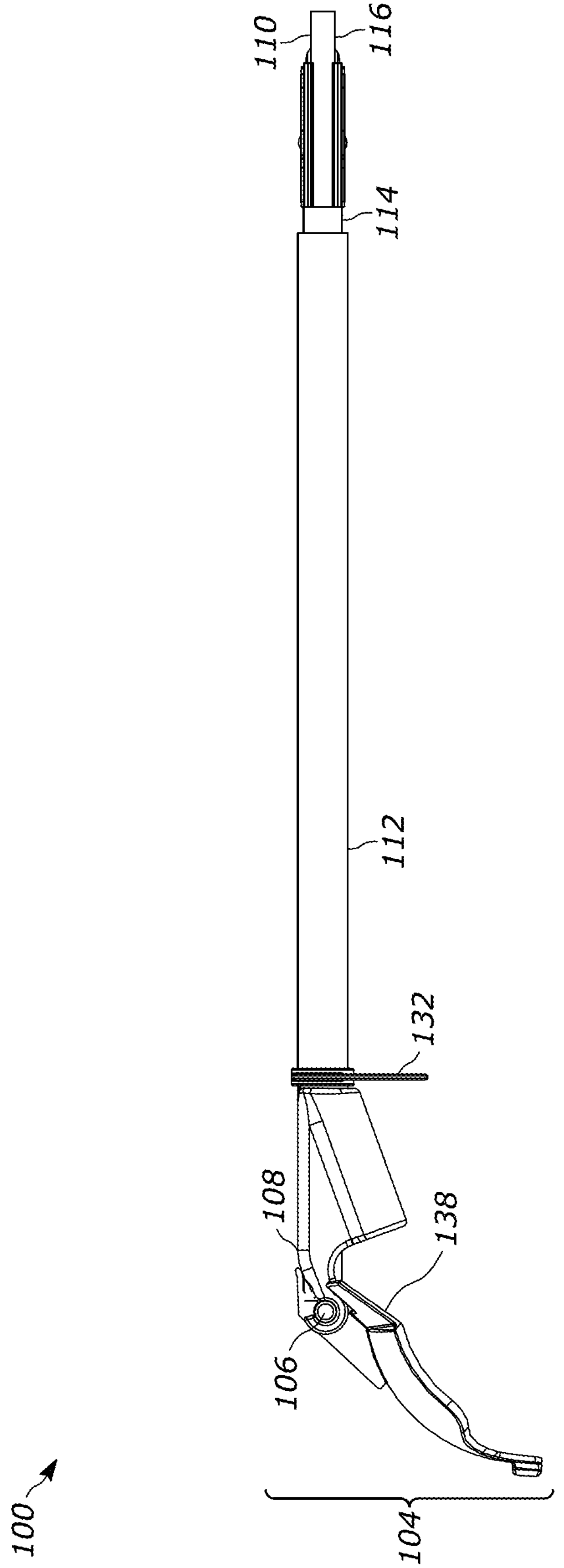
FIG. 2 depicts a side view of the pipe rodding guide tool of FIG. 1, with the deflector in a partially bent formation.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one of skill in the art to which this disclosure relates.

The inventors of the present disclosure have created a new apparatus and method for directing a flexible cleaning rod (a "snake") in a selected direction at a pipe junction which comprises a pipe rodding guide tool 100, 200.

First Embodiment of the Pipe Rodding Guide Tool

FIGS. 1-23 depict a first embodiment of a pipe rodding guide tool 100 and its component parts. The pipe rodding guide tool 100 comprises a rod 102 and a deflector 104. The rod 102 and deflector 104 are coupled together by a hinge 106. The pipe rodding guide tool 100 is capable of being in a resting or engaged position based on the positioning of the rod 102, deflector 104, and hinge 106. In a resting position, the rod 102 and deflector 104 form a straight or nearly straight line (i.e., the rod 102 and deflector 104 are approximately 180 degrees from one another), whereas in the engaged position, the deflector 104 is bent about the hinge such that the rod 102 and deflector 104 do not follow a straight line.

FIGS. 1-3, and 17-19 show a pipe rodding guide tool 100 in a resting position in accordance with an embodiment of the present disclosure. In the resting position, the pipe rodding guide tool 100 follows a straight or nearly straight line from end to end such that the rod 102 and deflector 104 are angled at one hundred eighty degrees or nearly one hundred eighty degrees from each other.

Figure 20:
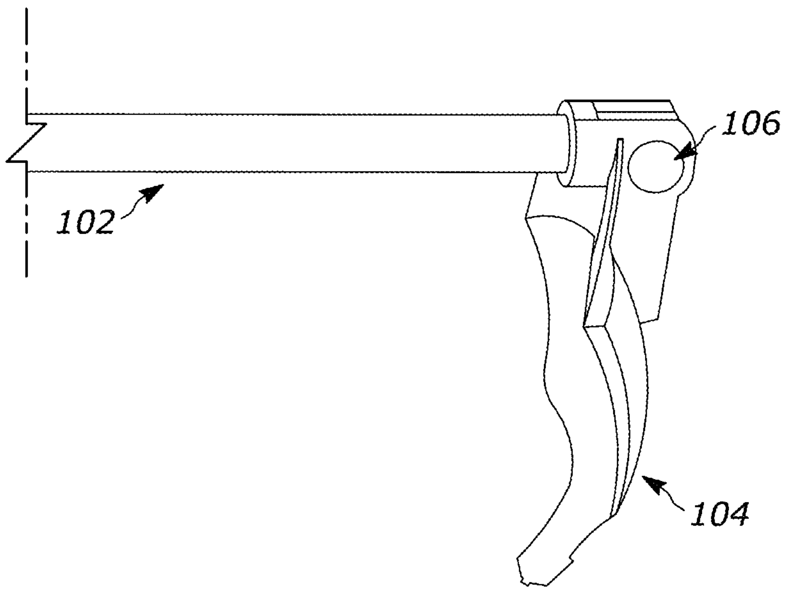
FIG. 20 depicts a side view of the pipe rodding guide tool of FIG. 1 in an engaged position, with the end portion removed.
Figure 21:
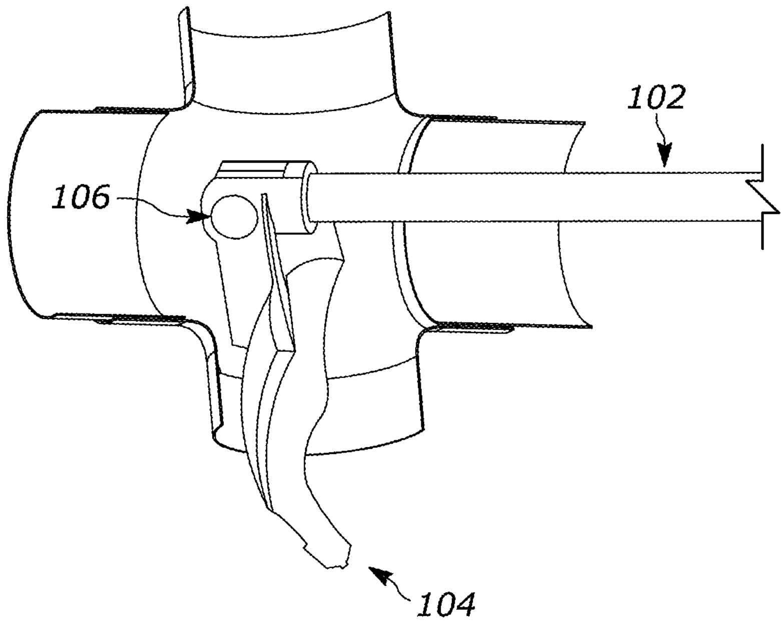
FIG. 21 depicts a side view of the pipe rodding guide tool of FIG. 20, with the pipe rodding guide tool inserted into a pipe junction and the pipe partially removed to display the interaction of the pipe rodding guide tool and pipe junction.
Figure 22:
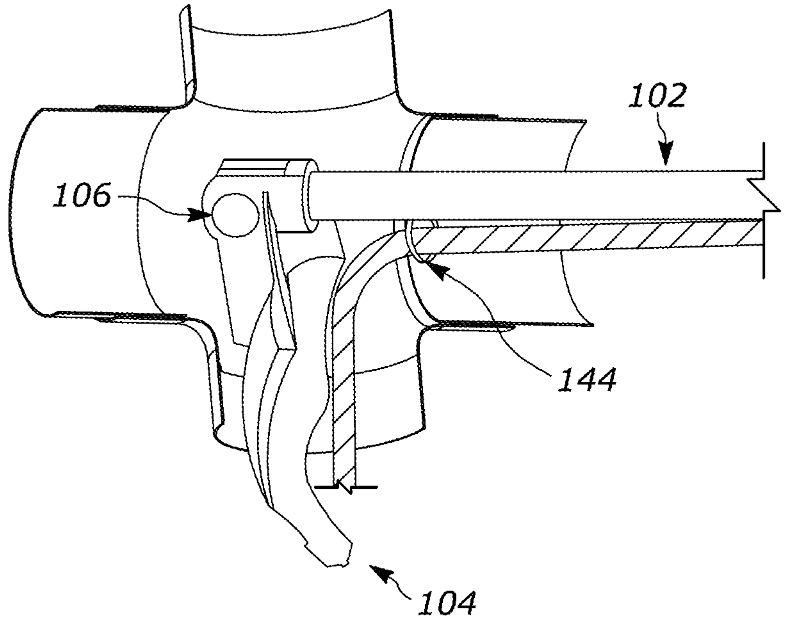
FIG. 22 depicts a side view of the pipe rodding guide tool in FIG. 21, which includes a grasping mechanism to grab a rodding cable.

FIGS. 20-22 show the pipe rodding guide tool 100 in the engaged position in accordance with an embodiment of the present disclosure. In the engaged position, the pipe rodding guide tool 100 is bent along the hinge 106. In the fully engaged position, the rod 102 and deflector 104 approximately form a right angle.

In the embodiment of FIGS. 1-23, the rod 102 is comprised of a non-deformable material and includes a first end 108 connected to (or forming a portion of) the hinge 106 and a second end 110, the second end comprising an extendable handle 116. In an embodiment, the extendable handle 116 connected to a grip 142.

In a preferred embodiment, the rod 102 is further comprised of three component parts: an outer housing 112, an interior housing 114, and an extendable handle 116. The outer housing 112 forms a cylindrical tube and is connected to an end piece 118, the end piece 118 proximate the first end 108 of the rod 102. The end piece 118 is connected to (or forms a portion of) the hinge 106*a*.

Figure 11:
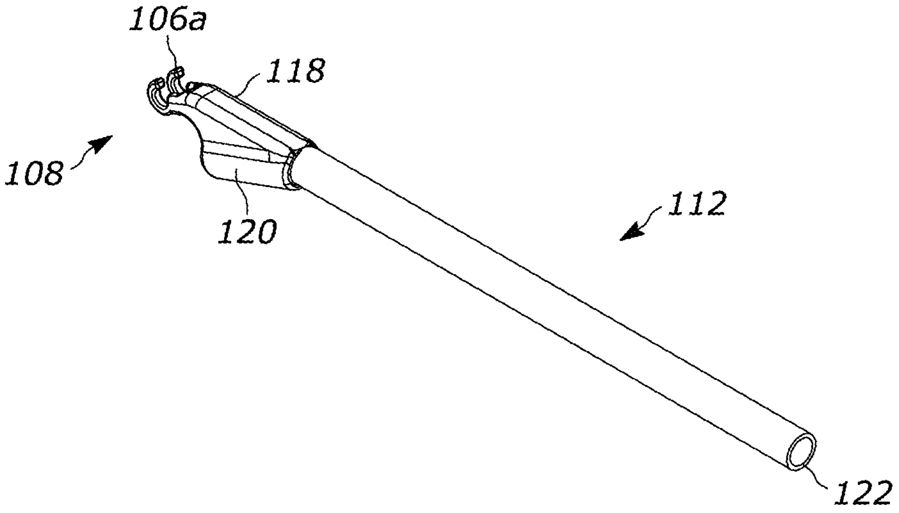
FIG. 11 depicts a perspective view of the outer housing for use with a pipe rodding guide tool.
Figure 12:
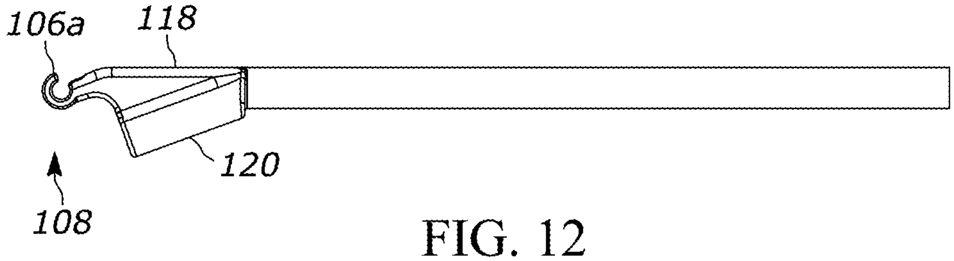
FIG. 12 depicts a side view of the outer housing of FIG. 11.

In the preferred embodiment, and as shown in FIGS. 11 and 12, the end piece 118 further comprises a flashlight component 120. The flashlight component 120 comprises both the flashlight and battery compartment. In the preferred embodiment, the flashlight component 120 is fixedly attached to the rod 102 via the end piece 118.

In an alternative embodiment, the frame of the flashlight component 120, rod 102, and end piece 118 are molded from a single piece of material such as a plastic, plastic resin, metal, composite, other similarly situated material, or combination thereof. In another alternative embodiment, the flashlight 120 is fixedly attached directly to the rod 102 by use of an adhesive, welding, heat treatment or alternative means that are known to a person of ordinary skill in the art. In a further alternative embodiment, the flashlight 120 is removably attached to the end piece 118. In such embodiment, the end piece 118 includes flexible extensions which attached to the flashlight 120 by connecting to the sides of the flashlight 120. In such embodiment, the flashlight is removably attached to the end piece 118 by application of force. Other embodiments comprise alternative attachment mechanisms between the rod 102, end piece 118 and flashlight 120 that are known to a person of ordinary skill in the art.

In alternative embodiments, the end piece 118 is removable or not included (as shown in FIGS. 20-22). In such embodiments, a hinge 106 connects the first end of the rod 108 and deflector 104. In further alternative embodiments, the end piece 118 may comprise a cover 252 (as described in the second embodiment of the pipe rodding guide tool 200).

As depicted in FIGS. 11 and 12, the interior of the outer housing 112 is generally hollow and has an opening 122 on the opposite side of the end piece 118. In an embodiment, the interior of the outer housing 112 comprises a series of protrusions as part of a locking system for the extendable handle 116. In an alternative embodiment, the outer housing 112 connects directly to the hinge 106.

Figure 13:
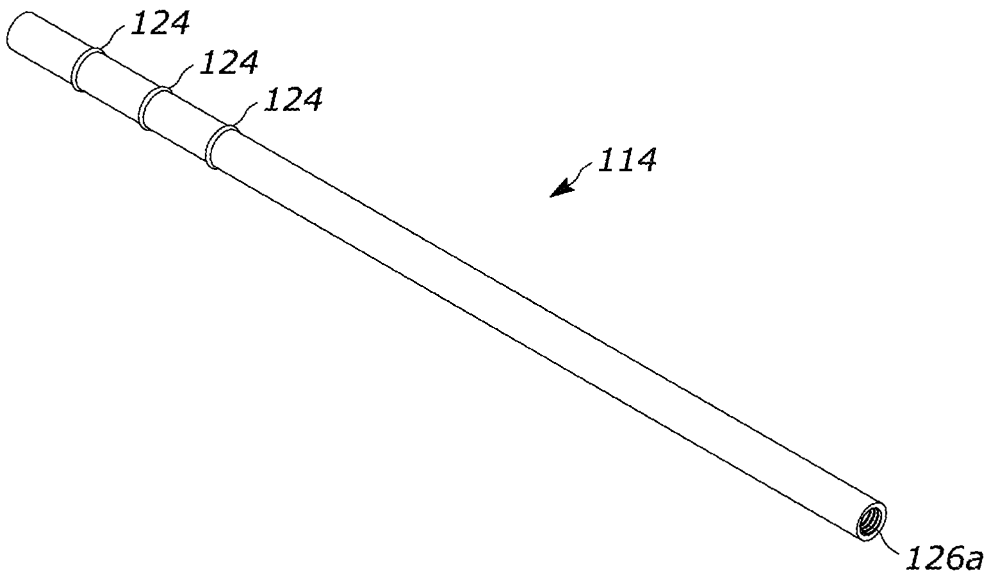
FIG. 13 depicts a perspective view of the interior housing for use with a pipe rodding guide tool.

As depicted in FIG. 13, the interior housing 114 forms a hollow cylindrical tube slightly smaller in diameter than the outer housing 116 with an opening at each end. The interior housing 114 is detachably connected to the outer housing 112. In an embodiment, the interior housing 114 comprises a plurality of ribs 124 proximate a first end. The ribs 124 are sized to engage with the protrusions within the outer housing 112 to form a locking mechanism for the extendable handle 116. The interior housing 114 comprises a second end which connects to the handle 116.

Figure 14:
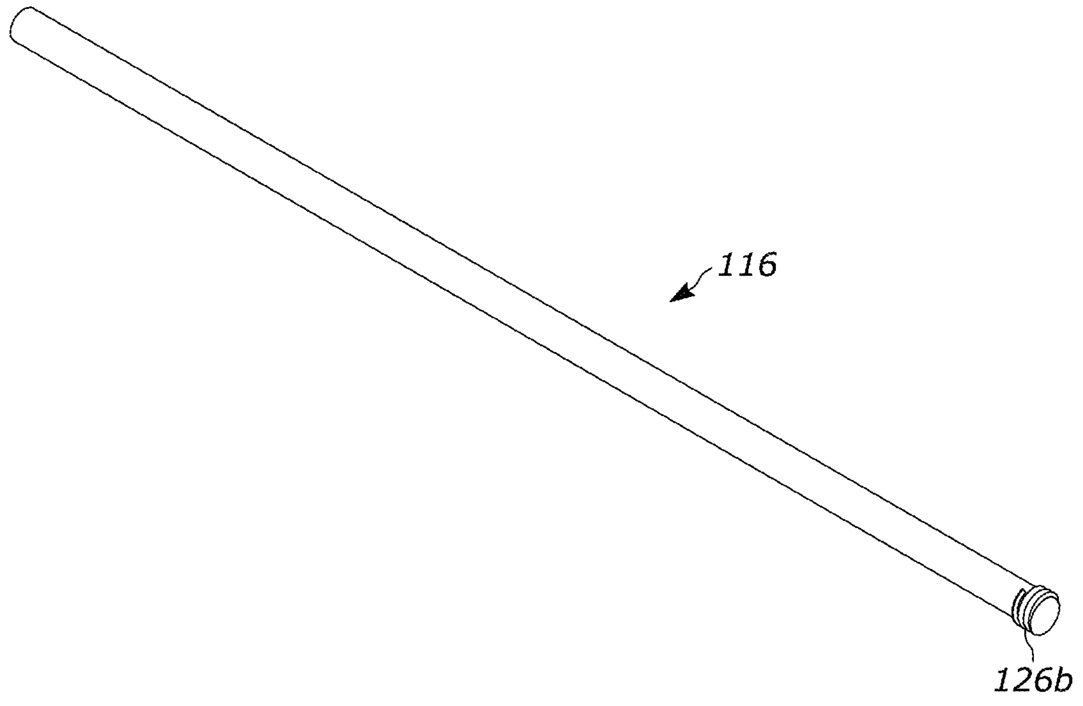
FIG. 14 depicts a perspective view of the extendable handle for use with a pipe rodding guide tool.
Figure 15:
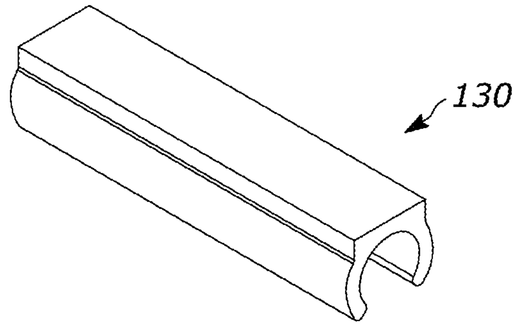
FIG. 15 depicts a perspective view of a clip attachment for use with a pipe rodding guide tool.
Figure 16:
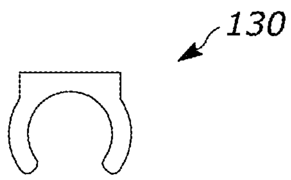
FIG. 16 depicts a front view of the clip attachment of FIG. 15.
Figure 17:
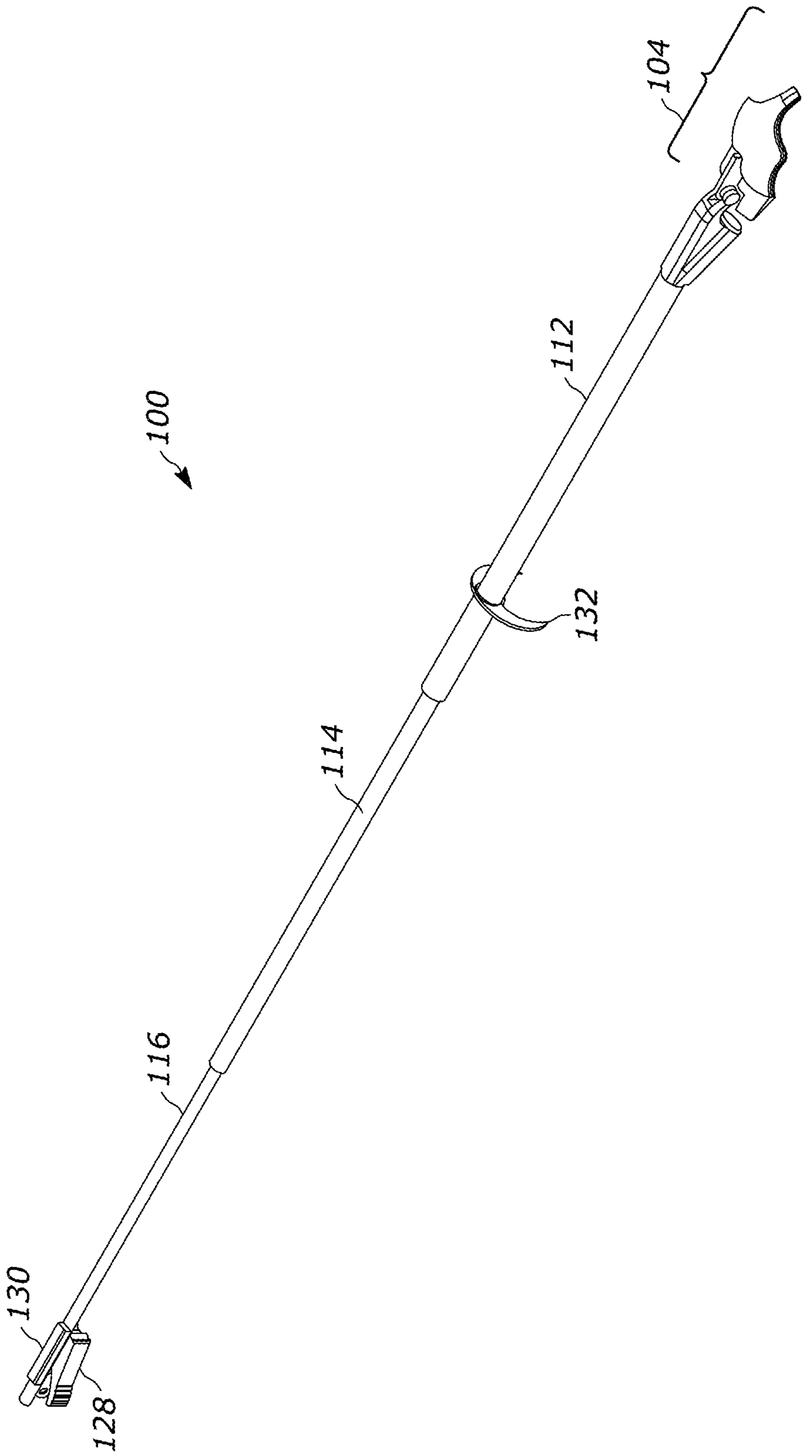
FIG. 17 depicts a perspective view of the pipe rodding guide tool of FIG. 1 in an extended and resting position.
Figure 18:
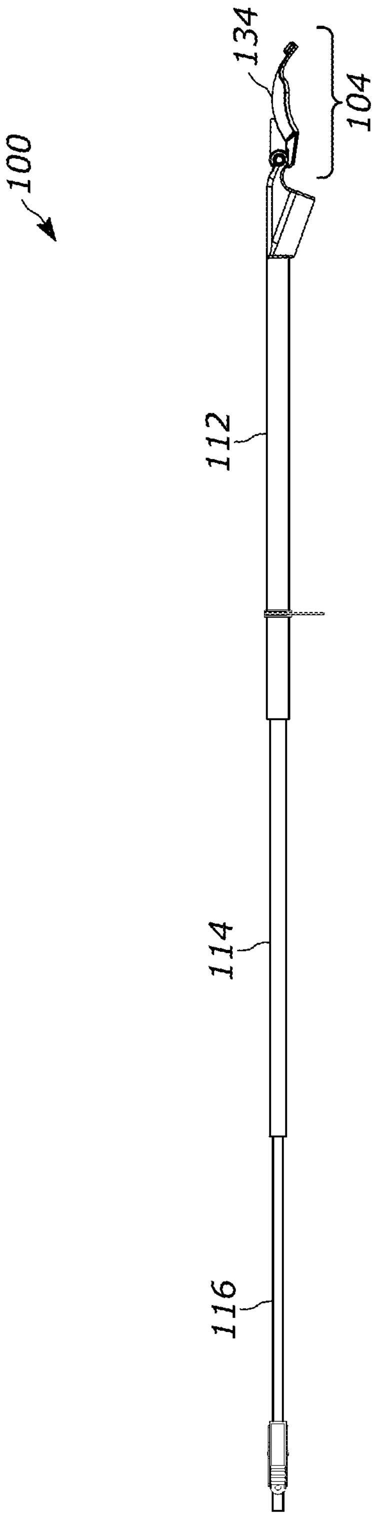
FIG. 18 depicts a side view of the pipe rodding guide tool of FIG. 17.

As depicted in FIG. 14, the extendable handle 116 is comprised of a solid tube slightly smaller in diameter than the interior housing 114. In the preferred embodiment, the handle is connected to the interior housing 114. In an embodiment, the interior housing 114 and extendable handle 116 are detachably connected via threaded portions at corresponding ends 126*a*, 126*b*. In alternative embodiments, the interior housing 114 and extendable handle 116 may be attached by other means known to a person of ordinary skill in the art.

Figure 23:
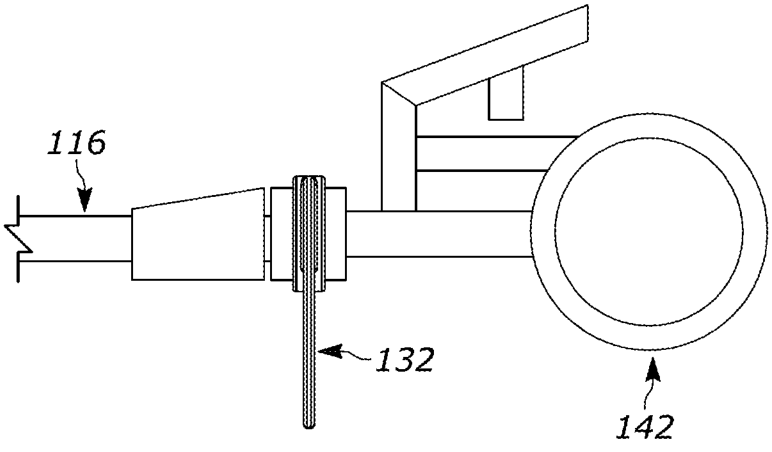
FIG. 23 depicts a side view of a grip for use with a pipe rodding guide tool.

As depicted in FIG. 23, the extendable handle 116 may comprise a grip 142 proximate the second end of the rod 110. The grip 142 provides a means for the user to move the rod 102 through a plumbing system or pipe. The grip 142 may be comprised of a loop comprising an open hole, a knob, a grip or other similar shapes.

The extension of the rod 102 operates telescopically such that a user can extend the rod 102 by holding the outer housing 112 in place and pulling on the extendable handle 116. As discussed above, the outer housing 112 and inner housing comprise a locking mechanism which allows the user to extend the rod to user-selected lengths. In the preferred embodiment, the user selects the desired length by pulling the handle 116 to the desired length such that the protrusions of the outer housing 112 engages with the ribs 124 of the interior housing and "locks" into place.

In alternative embodiments, the rod 102 comprises alternative locking mechanisms, or other mechanisms which allow for extension of the handle 116, which are known to a person of ordinary skill in the art.

In an embodiment, the grip 142 may comprise a grasping mechanism capable of opening and closing around an object such as a flexible rod, snake, or rodding cable as shown in FIGS. 22-23. The operation of the grasping mechanism is controlled by the grip 142. The grasping mechanism comprises the grip 142 (housing a trigger mechanism) and two arms 144 controlled by an actuator means which, when activated by the trigger mechanism causes the arms 144 to move between an open and closed position.

The arms 144 are in an open position until the trigger mechanism is activated by a user. The arms 144 return to their open position once the trigger mechanism is no longer activated. When the arms 144 are in an open position, they are spaced apart, whereas when the arms 144 are in a closed position, they are proximate one another and at least partially surround an object such as the rodding cable.

In an embodiment, the trigger mechanism is activated by compressing the grip 142. In another embodiment, the trigger mechanism is activated by pressing a button located on the grip 142. In further alternative embodiments, the trigger mechanism is activated by other methods known to a person of ordinary skill in the art.

Actuator means are known to a person having ordinary skill in the art, and comprise methods and devices used to move the spaced-apart ends of two or more arms 144 to be proximate each other.

Figure 3:
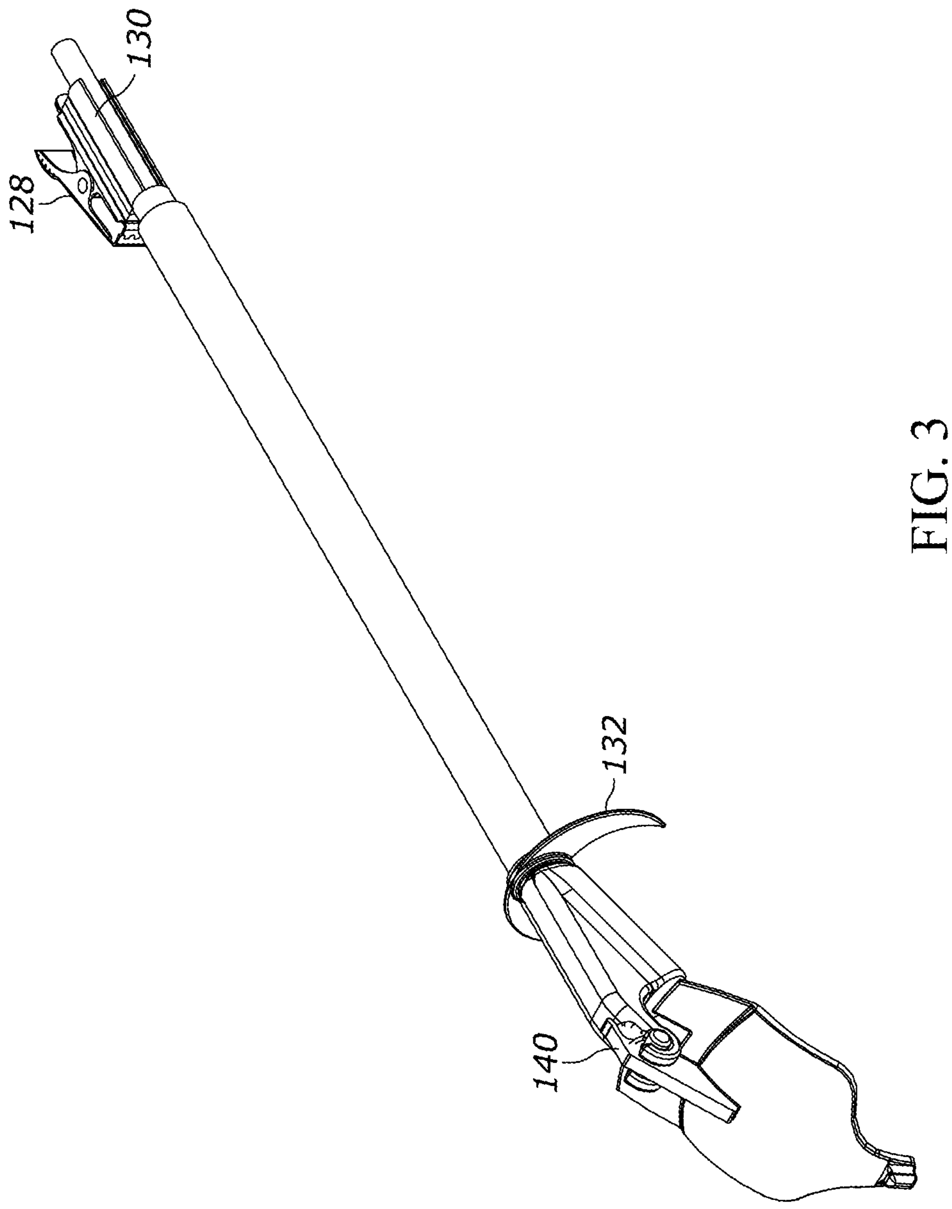
FIG. 3 depicts a perspective view of the pipe rodding guide tool of FIG. 1.
Figure 4:
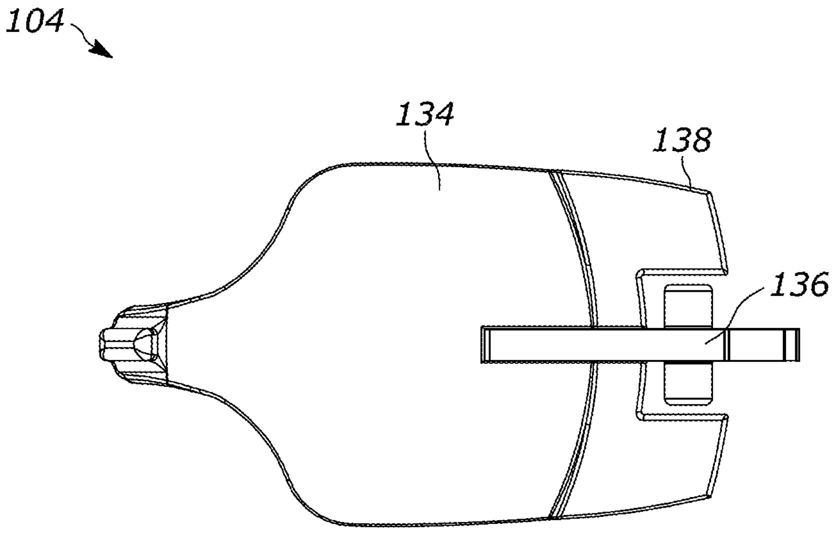
FIG. 4 depicts a top view of a deflector for use with a pipe rodding guide tool.

In an embodiment, a fastener 128 is detachably connected to the rod 102 via a clip attachment 130. As shown in FIG. 3, the clip attachment 130 is connected to the extendable handle 116. The clip attachment 130 may be fixed or rotatable about the extendable handle 116. In the preferred embodiment, the clip attachment 130 may slide along the extendable handle 116. The fastener 128 and clip attachment 130 are comprised of plastic, various plastic resins, metal, composites, other similarly situated materials, or a combination thereof.

In the preferred embodiment, the fastener 128—which attaches or clips to a pipe—and clip attachment 130 are slidably connected to the extendable handle 116. When the fastener 128 is attached to the pipe, the clip attachment 130 holds the pipe rodding guide tool 100 in a position such that the user can freely use both hands to clean the pipe without the need to use one or both hands to hold the tool 100 in position. The fastener 128 and clip attachment 130 comprises any means capable of attaching the rod 102 to the pipe. In a preferred embodiment, the fastener 128 comprises an alligator clip. In alternative embodiments, the fastener 128 comprises Velcro, a clasp, or any other similar fastening means.

In an alternative embodiment, the fastener 128 and clip attachment 130 may comprise a component which prevents the clip attachment 130 from sliding along the rod 102 by locking the clip attachment 130 in a fixed position on the rod 102. In an embodiment, the clip attachment 130 and fastener 128 can be removed from the rod 102 by a user at will. In further alternative embodiments, the clip attachment 130 and fastener may attach to the outer housing 112 or interior housing 114 (or where the rod 102 is comprised of a single component, anywhere along the rod 102).

Figure 8:
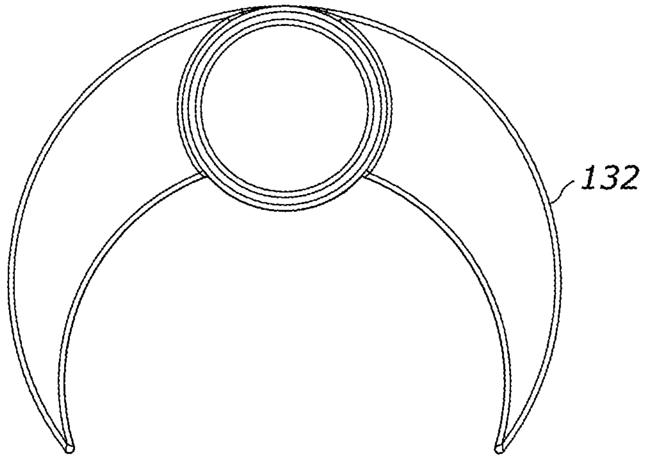
FIG. 8 depicts a front view of a guide component for use with a pipe rodding guide tool.
Figure 9:
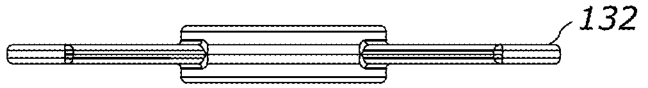
FIG. 9 depicts a bottom view of the guide component of FIG. 8.
Figure 10:
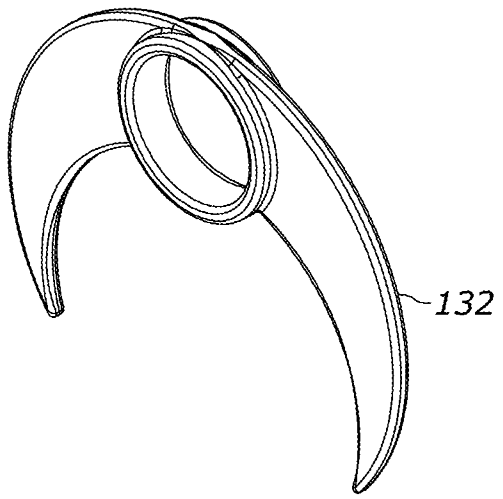
FIG. 10 depicts a perspective view of the guide component of FIG. 8.

Between the first end of the rod 108 and the second end of the rod 110 exist one or more guide components 132. The guide component(s) 132 fit within a plumbing system or pipe and provide a path as a means to smoothly guide a snake through a desired direction in the plumbing system or pipe. Specifically, the guide component(s) 132 maintain the position of the pipe rodding guide tool 100 in the pipe such that a user can freely use both hands without the need to hold the pipe rodding guide tool 100 in position. In a first embodiment, a guide component 132 is fixedly connected to the rod 102 proximate the end piece 118. In the preferred embodiment, the guide component(s) 132 are slidably connected to the rod 102 and capable of rotation about the axis of the rod 102. As depicted in FIGS. 8-10, the guide component(s) 132 are crescent-shaped and are comprised of comprised of plastic, various plastic resins, metal, composites, other similarly situated materials, or a combination thereof.

In an alternative embodiment, the rod 102 may comprises threaded portions. In this alternative embodiment, the guide component 132 is connected to the rod 102 via corresponding threaded portions. The corresponding threaded portions allows the guide component 132 to rotate around the axis of the rod 102. As such, a user may adjust the position of the guide component 132 along the length of the rod by rotating the guide component 132.

In the preferring embodiment of the pipe rodding guide tool 100, the rod 102 is narrow in diameter such that it can be placed within a standard household plumbing system or pipe. In the preferred embodiment, the rod 102 is comprised of a metal or metal alloy, plastic, plastic resin, a composite, or a combination thereof.

In an alternative embodiment of the pipe rodding guide tool 100, the rod 102 is molded from a single piece and does not include the three component parts (i.e., the outer housing 112, interior housing 114, extendable handle 116). In a further alternative embodiment, the extendable handle 116 and the interior housing 114 are not separate components and instead comprise a single piece which is connected to the outer housing 112.

In the embodiment of FIGS. 1-23, the deflector 104 comprises a body 134 and a hinge portion 136. In the embodiment shown, the body 134 comprises an arcuate shape and is solid in form (and weighted). A first edge of the body 134 forms the end of the deflector 104. The hinge portion 136 is connected proximate the second edge (opposite the first edge) of the body 134. Also proximate the second edge of the body 134 is a guide wall 138. The hinge portion 136 is connected to (or forms a portion of) the hinge 106*b*.

Figure 19:
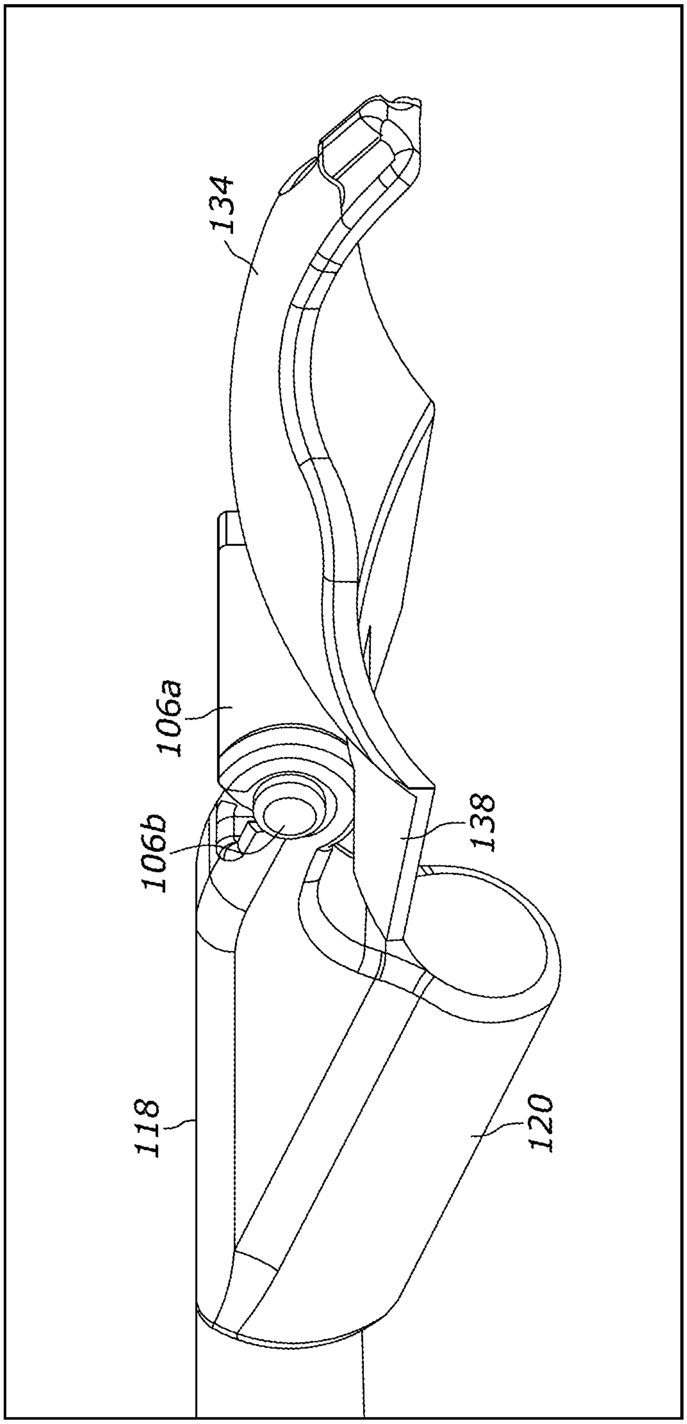
FIG. 19 depicts a perspective view of an end piece and deflector for use with a pipe rodding guide tool.

In the embodiment depicted in FIG. 19, the hinge portion 136 and end portion 118 connect to form a hinge 106. The hinge 106 comprises a means for the pipe rodding guide tool 100 to easily traverse various angles in a pipe. In particular, the hinge 106 allows for the deflector 104 to be positioned at various angles from the rod 102. In an embodiment, the hinge 106 is comprised of a joint that allows the hinge 106 to bend and is capable of forming obtuse, acute, and right angles between the rod 102 and the deflector 104. In alternative embodiments, the hinge 106 may comprise various alternative structures such as a bendable material, a spring, or a deformable material. In an additional alternative embodiment, the hinge 106 is adjustable by rotating the hinge 106 along the axis of the rod 102.

Figure 5:
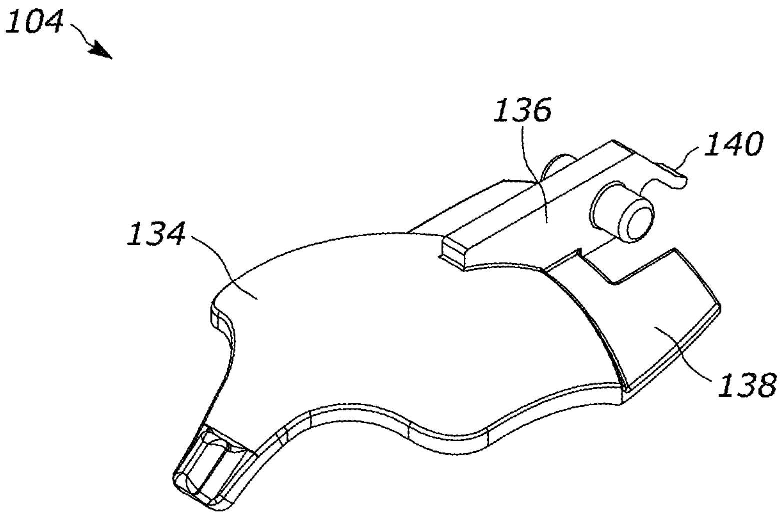
FIG. 5 depicts a perspective view of the deflector of FIG. 4.
Figure 6:
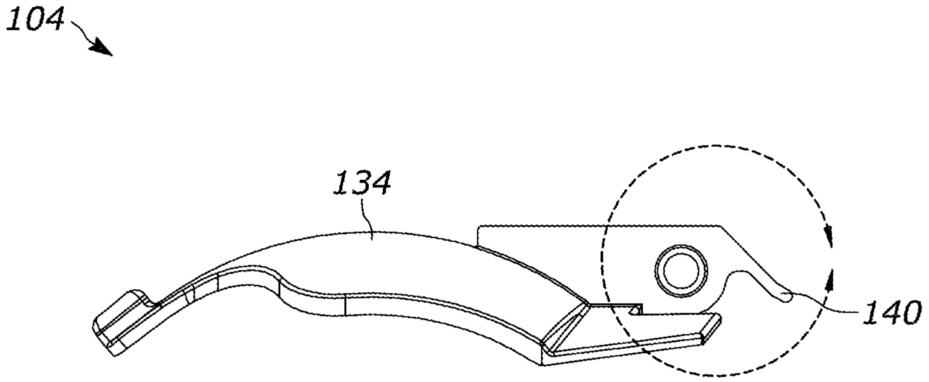
FIG. 6 depicts a side view of the deflector of FIG. 4.
Figure 7:
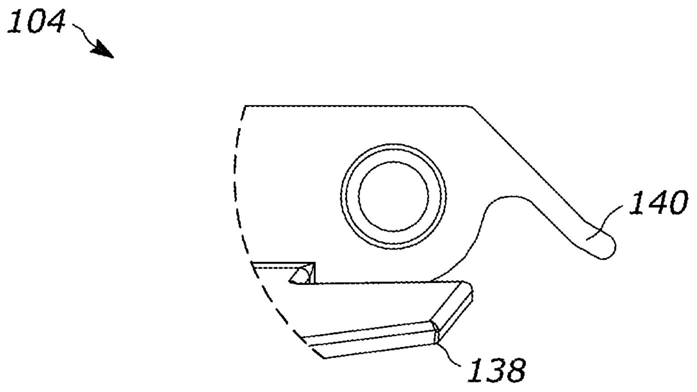
FIG. 7 depicts a close-up view of the lip of the deflector of FIG. 4.

The hinge portion 136 may comprise a lip 140 as depicted in FIGS. 5-7 which limits the rotation of the deflector 104. When the body 134 of the deflector 104 is pushed “upwards,” the lip 140 contacts the end portion 118 and provides a counter-force which stops the deflector 134 from continuing “upwards.” The lip 140 biases the hinge 106 to bend in a single direction to form obtuse, acute, and right angles between the rod 102 and the deflector 104.

When the deflector 104 (and guide tool 100) is in the engaged position, the guide wall 138 is aligned in a generally vertical direction. When the deflector 104 (and guide tool 100) are at rest, the guide wall 138 is aligned in a generally horizontal direction. When the pipe rodding guide tool 100 is in a fully engaged position, the guide wall 138 is pressed along the end piece 118 and effectively provides a “seal” to prevent a snake from passing around or above the body 134 of the deflector 104.

The deflector 104, hinge portion 136, and body 134 may be comprised of plastic, various plastic resins, metal, composites, other similarly situated materials, or a combination thereof. In addition, the deflector 104, the hinge portion 136, and body 134 may be comprised of a variety of shapes.

In an embodiment, the deflector 104 is weighted such that when a user holds the pipe rodding guide tool 100 horizontally, gravity acts on the body 134 to bend the pipe rodding guide tool 100 along the hinge 106. In alternative embodiments, the grip 142 provides a means to alternate the deflector 104 between its resting and engaged position. In this alternative embodiment, the grip 142 comprises a trigger mechanism. When the trigger mechanism is activated, the deflector 104 moves to the engaged position, whereas when the trigger mechanism is not activated, the deflector 104 moves to the resting position.

Second Embodiment of the Pipe Rodding Guide Tool

FIGS. 24-34 depict a second embodiment of the pipe rodding guide tool 200. Except as otherwise noted herein, like reference numbers (e.g., elements 102 and 302) are used to identify like components. Pipe rodding guide tool 200 is generally similar to pipe rodding guide tool 100, except as noted herein.

As shown, pipe rodding guide tool comprises a rod 202 and a deflector 204. The rod 202 and deflector 204 are coupled together by a hinge 206. The pipe rodding guide tool 200 is capable of being in a resting or engaged position based on the positioning of the rod 202, deflector 204 and hinge 206. In a resting position, the hinge 206 is not bent, such that the rod 202 and deflector 204 form a straight or nearly straight line, whereas in the engaged position, the hinge 206 is in a bent position such that the rod 202 and deflector 204 do not follow a straight line.

Figure 24:
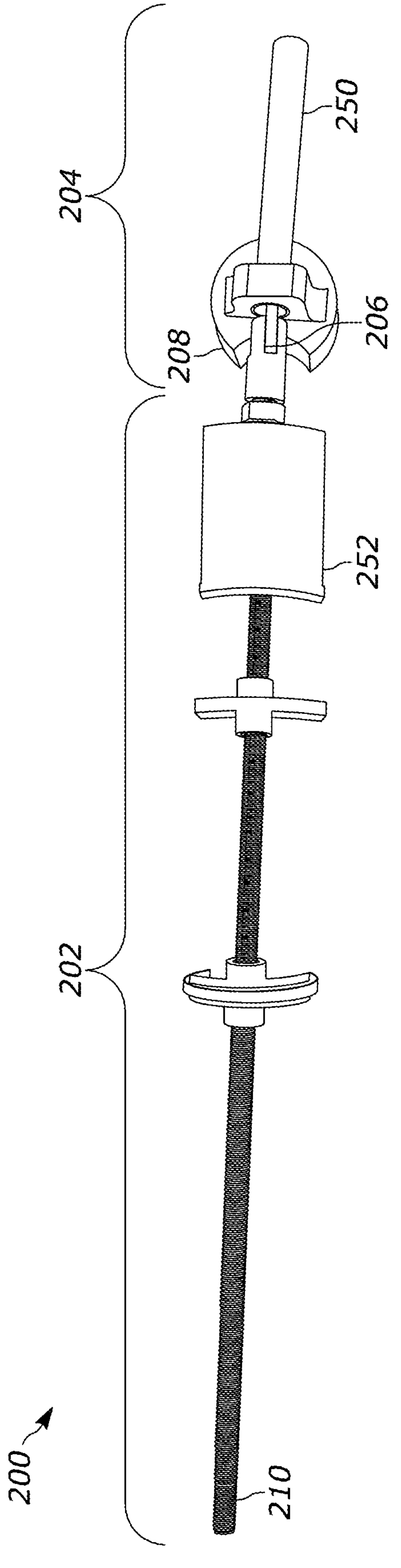
FIG. 24 depicts a top view of a second embodiment of the pipe rodding guide tool.
Figure 25:
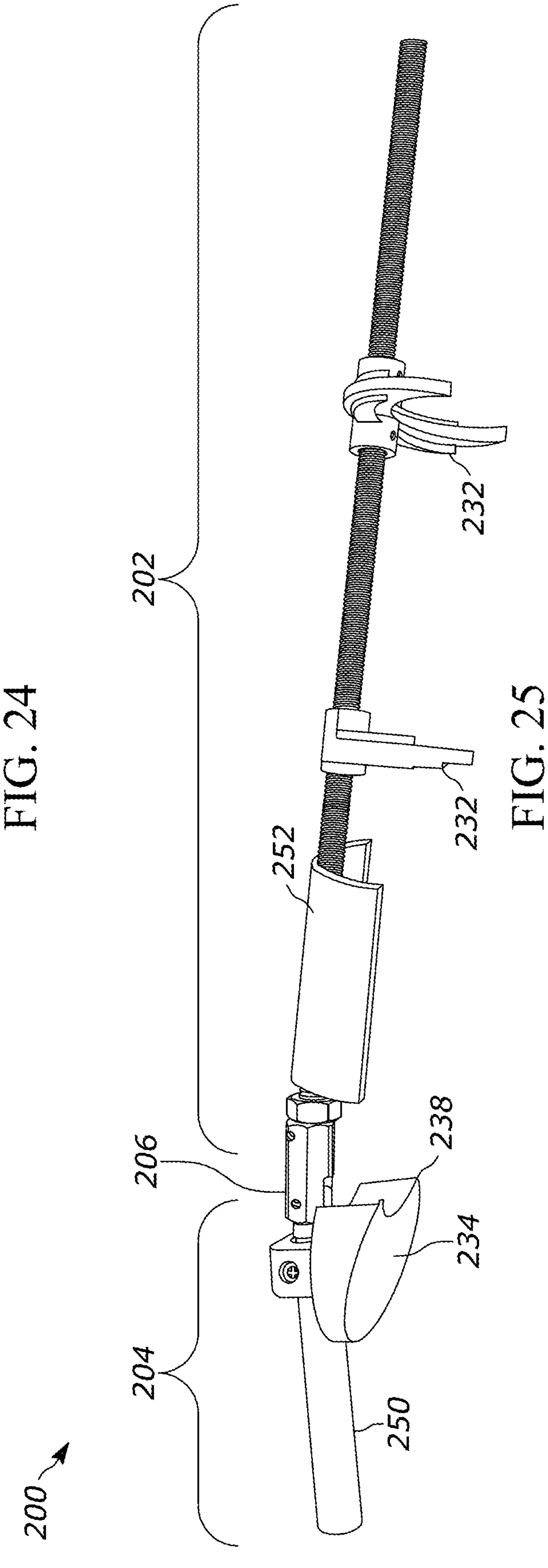
FIG. 25 depicts a side view of the pipe rodding guide tool of FIG. 24.
Figure 26:
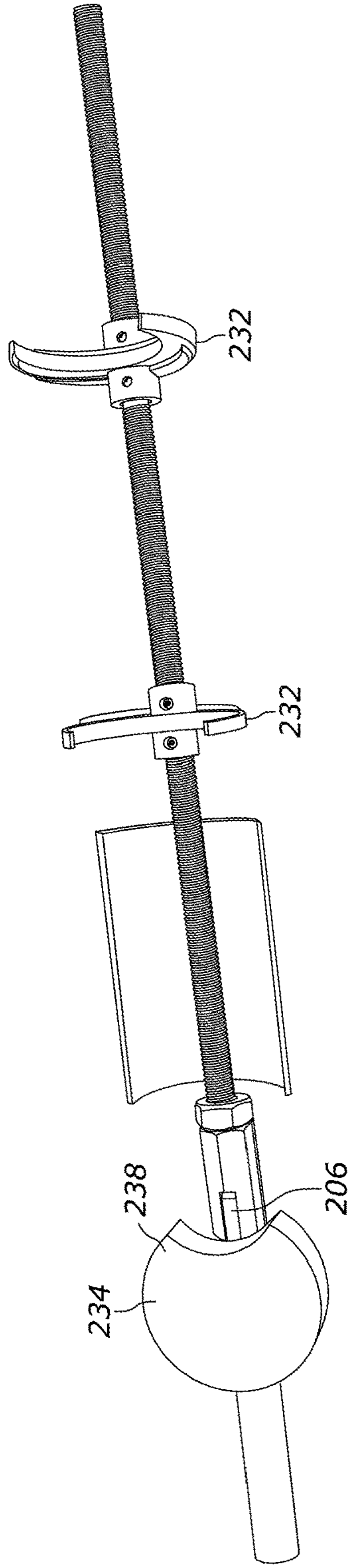
FIG. 26 depicts a bottom view of the pipe rodding guide tool of FIG. 24.
Figure 27:
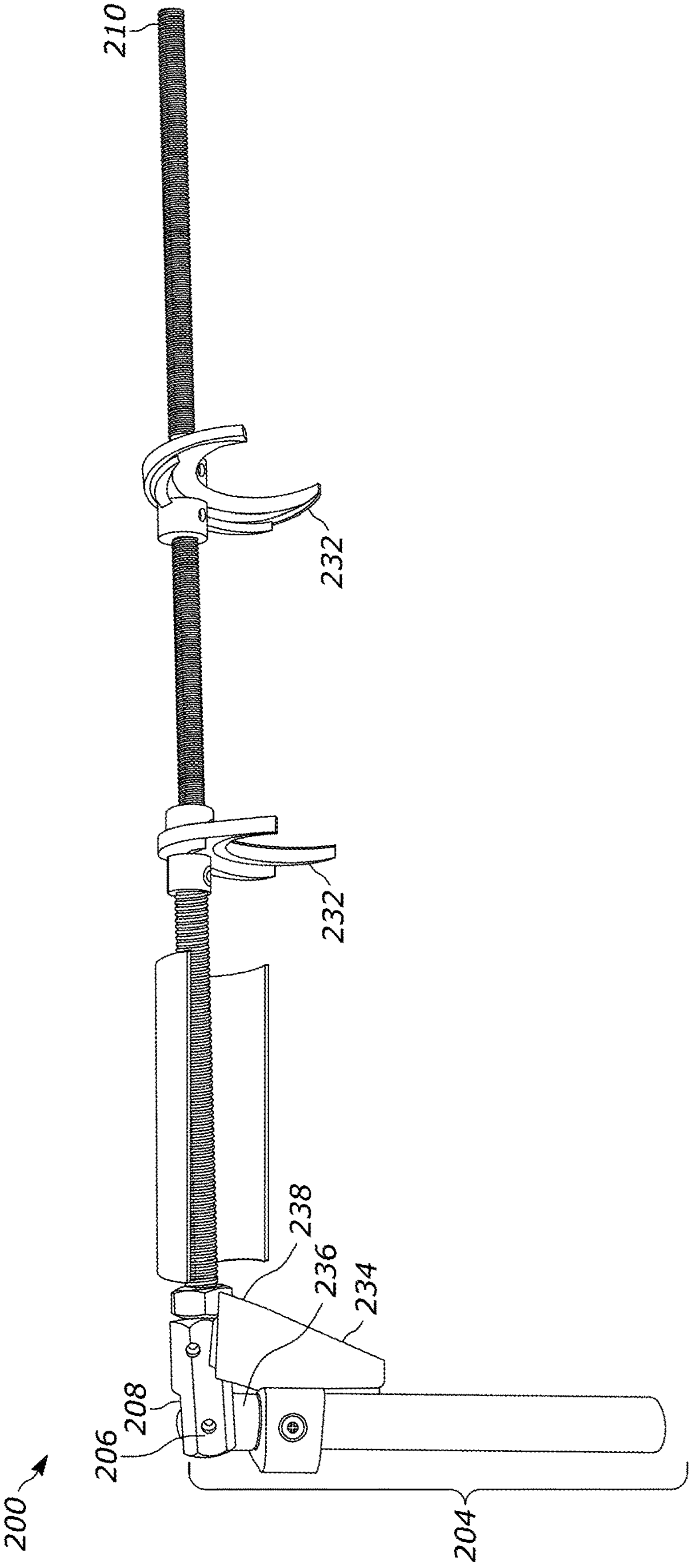
FIG. 27 depicts a side view of the pipe rodding guide tool of FIG. 24, with the deflector in an engaged formation.

FIGS. 24-26, show a pipe rodding guide tool 200 in a resting position in accordance with the second embodiment of the present disclosure. In the resting position, the pipe rodding guide tool 200 follows a straight or nearly straight line from end to end such that the rod 202 and deflector 204 are angled at approximately one hundred eighty degrees from each other.

FIGS. 27-28, 31-34 show the pipe rodding guide tool 200 in the engaged position in accordance with an embodiment of the present disclosure. In the engaged position, the pipe rodding guide tool 200 is bent along the hinge 206 such that the rod 202 and deflector 204 are angled at less than one hundred eighty degrees from one another. In the fully engaged position, the rod 102 and deflector 204 form a right angle.

In the embodiment of FIGS. 24-34, the rod 202 is comprised of a non-deformable material and includes a first end 208 connected to (or forming a portion of) the hinge 206 and a second end 210. The rod 202 is narrow in diameter such that it can be placed within a standard household plumbing system or pipe. In a preferred embodiment, the rod 202 is comprised of a metal or metal alloy, a plastic, plastic resin, composite, other similarly situated materials, or a combination thereof. A grip 242 is optionally attached to the second end 210 of the rod 202. The grip 242 may be comprised of a loop comprising an open hole, a knob, a grip or other similar structures.

In the embodiment shown in FIGS. 24-26, the deflector 204 may comprise an extended portion 250 connected to a body 234. A hinge portion 236, connects the deflector 204 to the hinge 206. In the preferred embodiment, the extended portion 250 is cylindrical in shape, is solid in form, and is weighted such that when a user holds the pipe rodding guide tool 200 horizontally, gravity acts on the extended portion 250 to bend the tool 200 along the hinge 206. The extended portion 250 may be comprised of plastic, various plastic resins, metal, composites, other similarly situated materials, or a combination thereof. In addition, the extended portion 250 may be comprised of a variety of shapes.

In the embodiment shown in FIGS. 24-26, the body 234 is comprised of a cylindrical shape with a guide wall 238 to ensure that the snake is directed along the desired path and in the direction of the body 234. When the pipe rodding guide tool 200 is in a fully engaged position, the guide wall 238 is pressed along the hinge 206 and effectively provides a “seal” to prevent a snake from passing around or above the body 234 of the deflector 204. The deflector 204, body 234, and guide wall 238 may be comprised of plastic, various plastic resins, metal, composites, other similarly situated materials, or a combination thereof.

In the embodiment of FIGS. 24-34 of the present disclosure, the hinge 206 comprises a means for the pipe rodding guide tool 200 to traverse various angles in a pipe at ease. In particular, the hinge 206 allows for the deflector 204 to be positioned at various angles from the rod 202. In a preferred embodiment, the hinge 206 is comprised of a joint that allows the hinge 206 to bend in a single direction and is capable of forming obtuse, acute, and right angles between the rod 202 and the deflector 204. In alternative embodiments, the hinge 206 may comprise various alternative structures such as a bendable material, a spring, a deformable material, or other structures known to a person of ordinary skill in the art. In an additional alternative embodiment, the hinge 206 is adjustable by rotating the hinge 206 along the axis of the rod 202.

In the embodiment depicted in FIGS. 24-34, between the first end 208 and second end 210 of the rod 202 exists at least one guide component 232. The guide component 232 fits within a plumbing system or pipe and provides a path as a means to smoothly guide a snake through a desired direction in the plumbing system or pipe. Specifically, the guide component 232 maintains the position of the pipe rodding guide tool 200 in the pipe such that a user can freely use both hands without the need to hold the pipe rodding guide tool 200 in position. In a preferred embodiment, a first guide 232 is fixedly connected to the rod 202 proximate the cover 252 and a second guide component 232 is slidably connected to the rod 202 and capable of rotation about the axis of the rod 202. In the preferred embodiment, the guide component(s) 232 are crescent shaped and comprised of plastic, various plastic resins, metal, composites, other similarly situated materials, or a combination thereof. In an alternative embodiment, the guide component(s) 232 are spaced apart, slidably connected to the rod 202, and separately capable of rotating about the axis of the rod. Alternate embodiments may comprise less than one or more than two guide components 232 which are fixedly connected to the rod 202, slidably connected to the rod 202, or detachably connected to the rod 202.

In the embodiment shown in FIGS. 24-34, the pipe rodding guide tool 200 comprises a cover 252 fixedly attached to a portion of the rod 202 and located proximate the hinge 206. In a preferred embodiment, the cover 252 partially extends around the rod 202 to form a portion of a cylinder. The cover 252 may be comprised of plastic, various plastic resins, metal, composites, other similarly situated materials, or a combination thereof. In an embodiment, the cover 252 and the rod 202 are molded from a single piece of material.

In the fully engaged position, the body 234, guide wall 238, and the cover 252 form a curve near the hinge 206 of the pipe rodding guide tool 200 to guide a snake in a desired direction.

Further embodiments of the pipe rodding guide tool 200 may comprise all, combinations of, or none of the following features (i.e., the Extendable Handle, Loop and Clip Component, Flashlight Component, and/or Grasping Device).

Extendable Handle

In the embodiment shown in FIGS. 28, 32-34, the rod 202 is extendable. In the embodiment shown in FIGS. 28, 32-34, the rod 202 comprises an exterior housing 212 and an extendable handle 216.

In the preferred embodiment, the exterior housing 212 of the rod 202 is hollow and comprises an opening 222 proximate the second end 210 of the rod 202. The exterior housing 212 houses an extendable handle 216 which is accessible via the opening 222 of the exterior housing 212. In order to fit within the rod 202, the extendable handle 216 of the rod 202 must be smaller in diameter than the portion of the rod 302 which provides the housing 212. The outer housing 212 forms a cylindrical tube and is connected to an end piece 218 proximate the first end 208 of the rod 202. The end piece 218 is connected to (or forms a portion of) the hinge 206.

In this embodiment, the extension of the rod 202 operates telescopically such that a user can extend the rod 202 by holding the exterior/housing portion of the rod 202 in place and pulling on the grip 242. In an embodiment, the interior portion of the outer housing 212 and the extendable handle 216 contain corresponding locking mechanisms which allow a user to extend the rod to user-selected lengths. The locking mechanisms may be comprised of grooves, protrusions, interlocking tabs, or other similar features. In an embodiment, the locking mechanism comprises a series of grooves arranged longitudinally along the interior surface of the outer housing 212 (as described in the first embodiment) and a series of tabs arranged longitudinally along the surface of the extendable handle 216. In this embodiment, the user selects the desired length by pulling extendable handle 216 from the rod 202 to the desired length and rotating the extendable portion 216 such that the tab enters/engages the groove and “locks” the extendable portion 216 into place.

In alternative embodiments, the outer housing 212 and extendable portion 216 comprise alternative locking mechanisms, or other mechanisms which allow for extension of the extendable portion 216, which are clear to a person of ordinary skill in the art. The extendable portion 216 may be comprised of plastic, various plastic resins, metal, composites, other similarly situated materials, or a combination thereof.

In the preferred embodiment, the grip 242 may be comprised of a loop comprising an open hole, a knob, a grip or other similar structures. Further, in the preferred embodiment, the rod 202 is extendable by up to a length of itself. In alternative embodiments, other lengths of extension are considered.

In an embodiment, the surface and/or interior of the outer housing 212 comprises a threaded portion between. In this alternative embodiment, the guide component 232 is connected to the outer housing 212 via corresponding threaded portions. The corresponding threaded portions allow the guide component 232 to rotate around the axis of the rod 202. In this alternative embodiment, a user can rotate the guide component 232 to adjust its respective positions along the length of the rod 202.

Similarly, in an embodiment, the exterior of the extendable handle 216 comprises a corresponding threaded portion which a user may rotate to adjust the length of the extendable portion 216 of the rod 202.

Loop and Clip Component

In an embodiment of the pipe rodding guide tool 200, a loop and clip component (or a fastener and clip attachment) 228, 230 is slidably connected to the rod 202 and capable of rotation about the axis of the rod 202. In the preferred embodiment, the loop and clip component 228, 232 are comprised of plastic, various plastic resins, metal, composites, other similarly situated materials, or a combination thereof.

Figure 32:
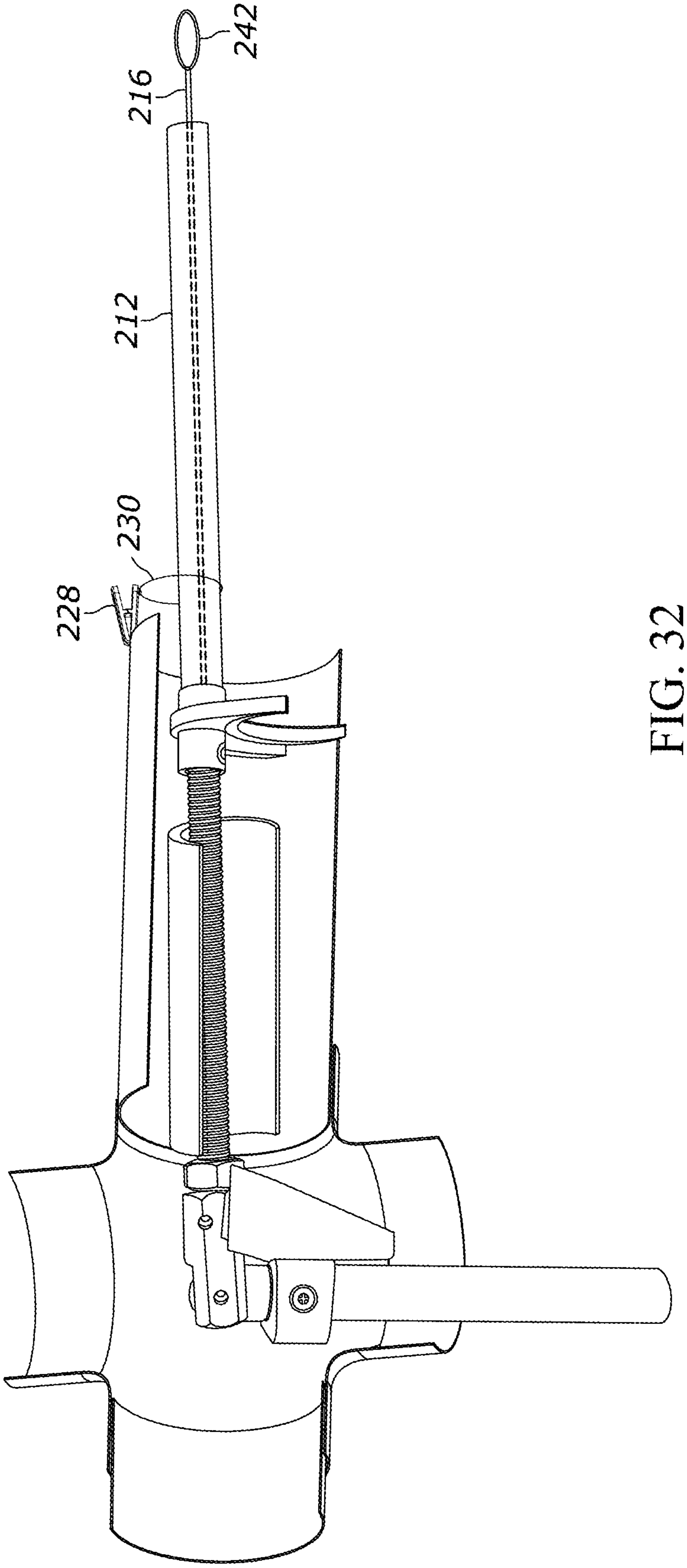
FIG. 32 depicts a side view of the pipe rodding guide tool of FIG. 24, (with an extendable handle and a loop and clip attachment) with the pipe rodding guide tool inserted in a pipe junction, a portion of which is removed to show the interaction of the pipe rodding guide tool and pipe junction.
Figure 33:
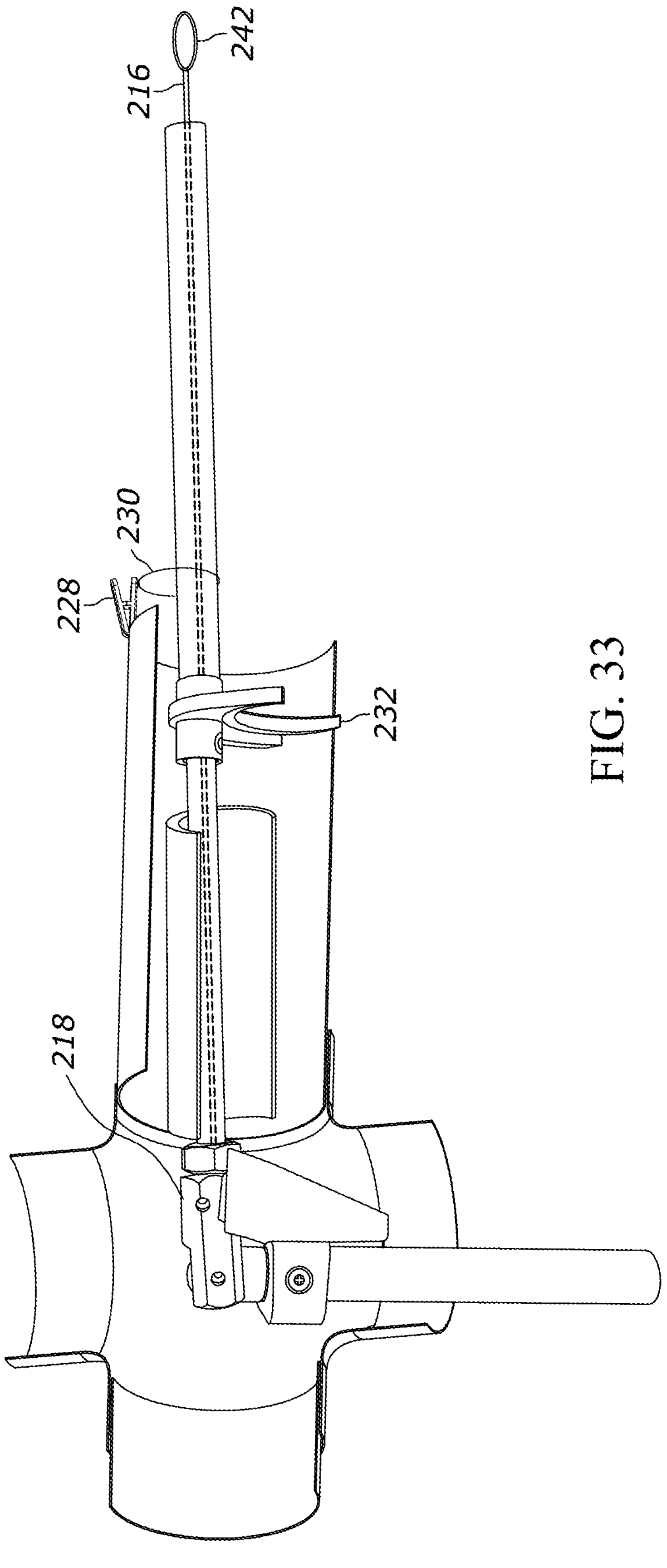
FIG. 33 depicts a second side view of the pipe rodding guide tool of FIG. 24, (with an extendable handle and a loop and clip attachment) with the pipe rodding guide tool inserted in a pipe junction, a portion of which is removed to show the interaction of the pipe rodding guide tool and pipe junction.

In the embodiment shown in FIGS. 32-33 the loop and clip component 228, 230 comprises a clip 228—which attaches (or clips) to the pipe—and a loop 230 which is slidably connected to the rod 202. When the clip 228 is attached to the pipe, the loop and clip component 228, 230 holds the pipe rodding guide tool 202 in position such that the user can freely use both hands to clean the pipe without the need to use one or both hands to hold the tool 200 in position.

The clip 228 comprises any means capable of attaching the rod 202 to the pipe. In a preferred embodiment, the clip 228 comprises an alligator clip. In an alternative embodiment, the clip 228 comprises Velcro, a clasp, or any other similar fastening means. In a further embodiment, the fastener and clip attachment 128, 130 of the first embodiment may be combined with the pipe rodding guide tool of the second embodiment 200 (and vice versa).

In an embodiment, the loop 230 may comprise a component which prevents the loop 230 from sliding along the rod 202 by "locking" the loop 230 in a fixed position on the rod 202 and can be removed from or attached to the rod 202 by the user at will.

Flashlight Component

In a further embodiment, the rod 202 comprises a flashlight 220 located proximate the cover 252. The flashlight 220 comprises both the flashlight itself and a battery compartment.

Figure 28:
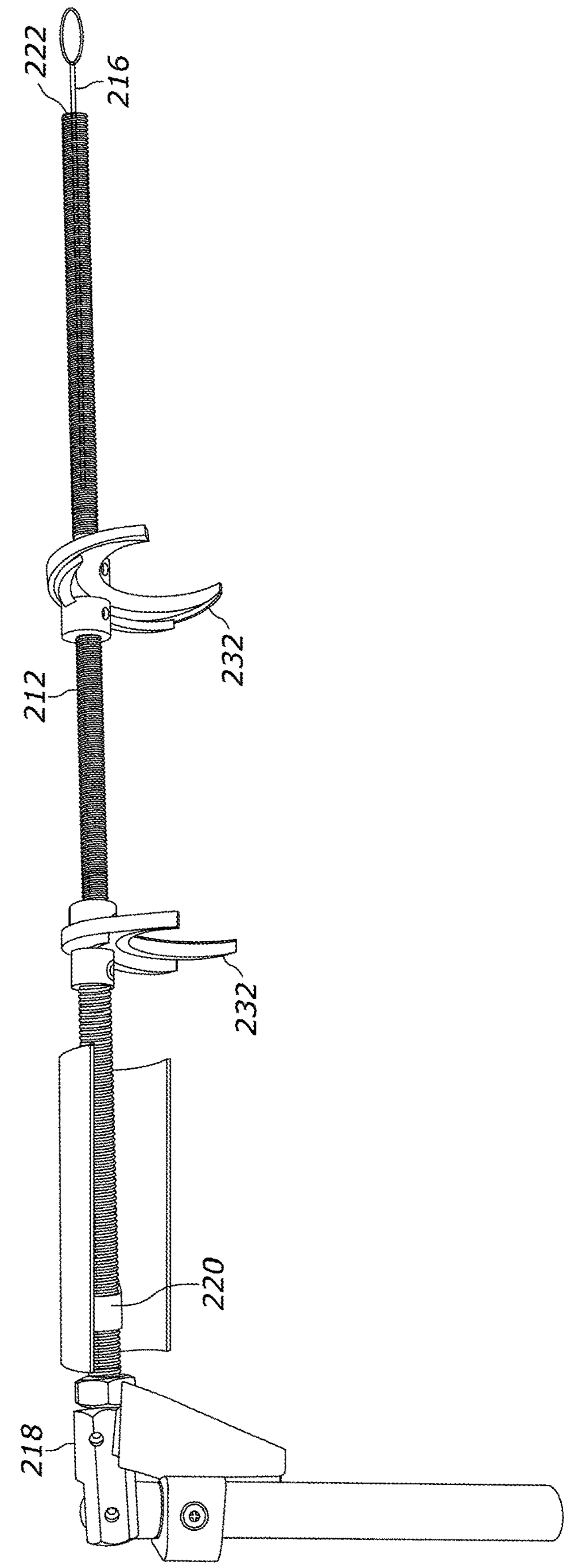
FIG. 28 depicts a side view of the pipe rodding guide tool of FIG. 24, with a flashlight and grip attachment.
Figure 29:
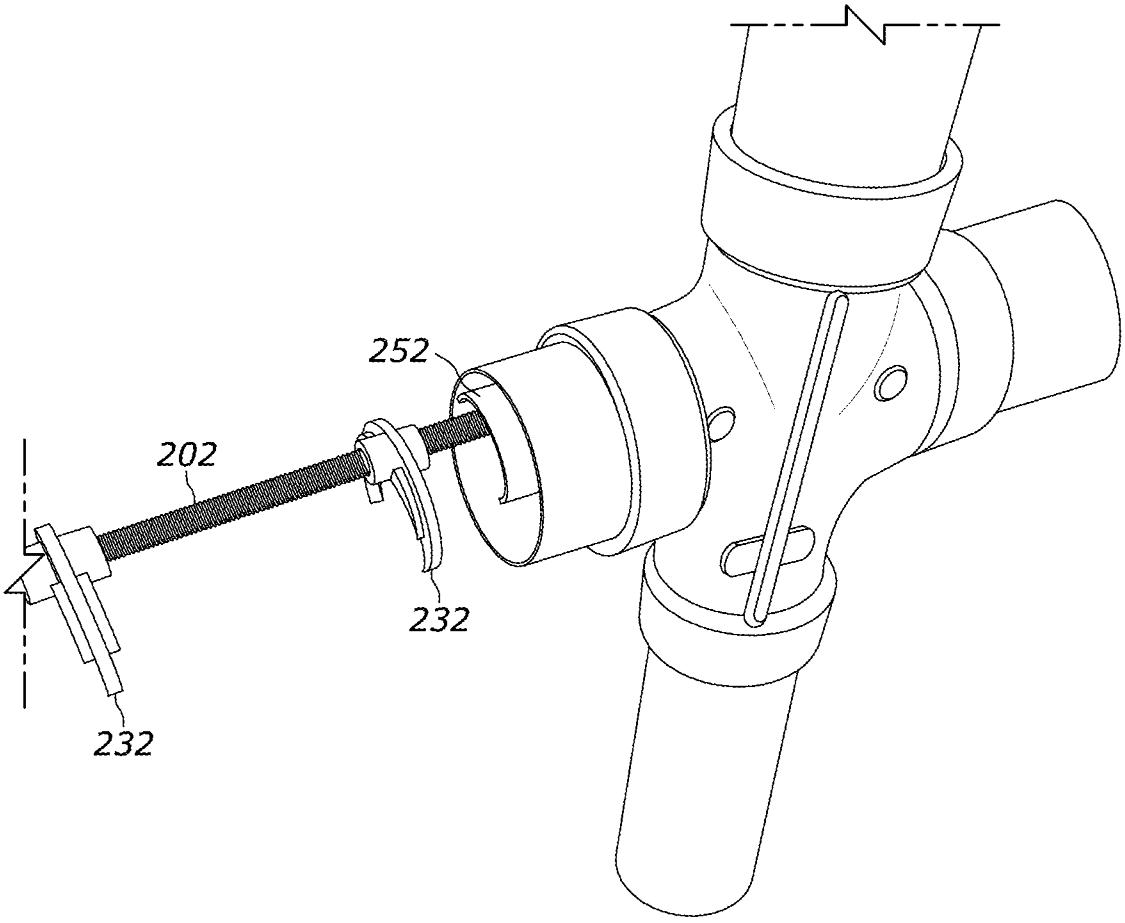
FIG. 29 depicts a perspective view of the pipe rodding guide tool of FIG. 24, with the pipe rodding guide tool interacting with a pipe junction.
Figure 30:
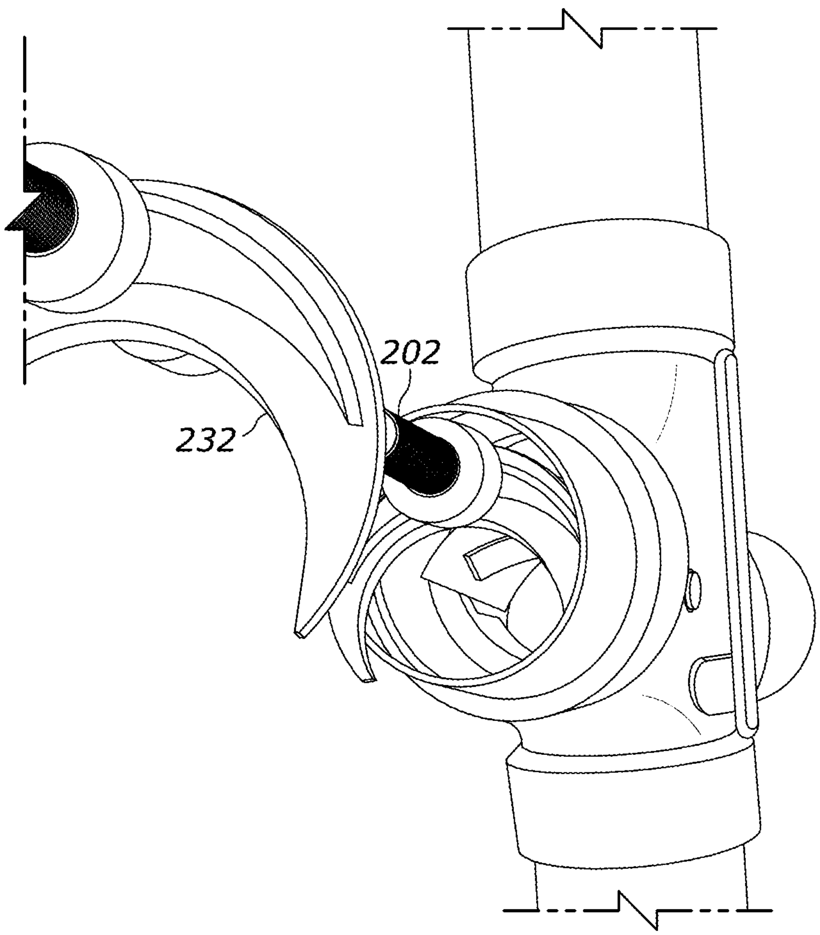
FIG. 30 depicts a second perspective view of the pipe rodding guide tool of FIG. 24, with the pipe rodding guide tool interacting with a pipe junction.
Figure 31:
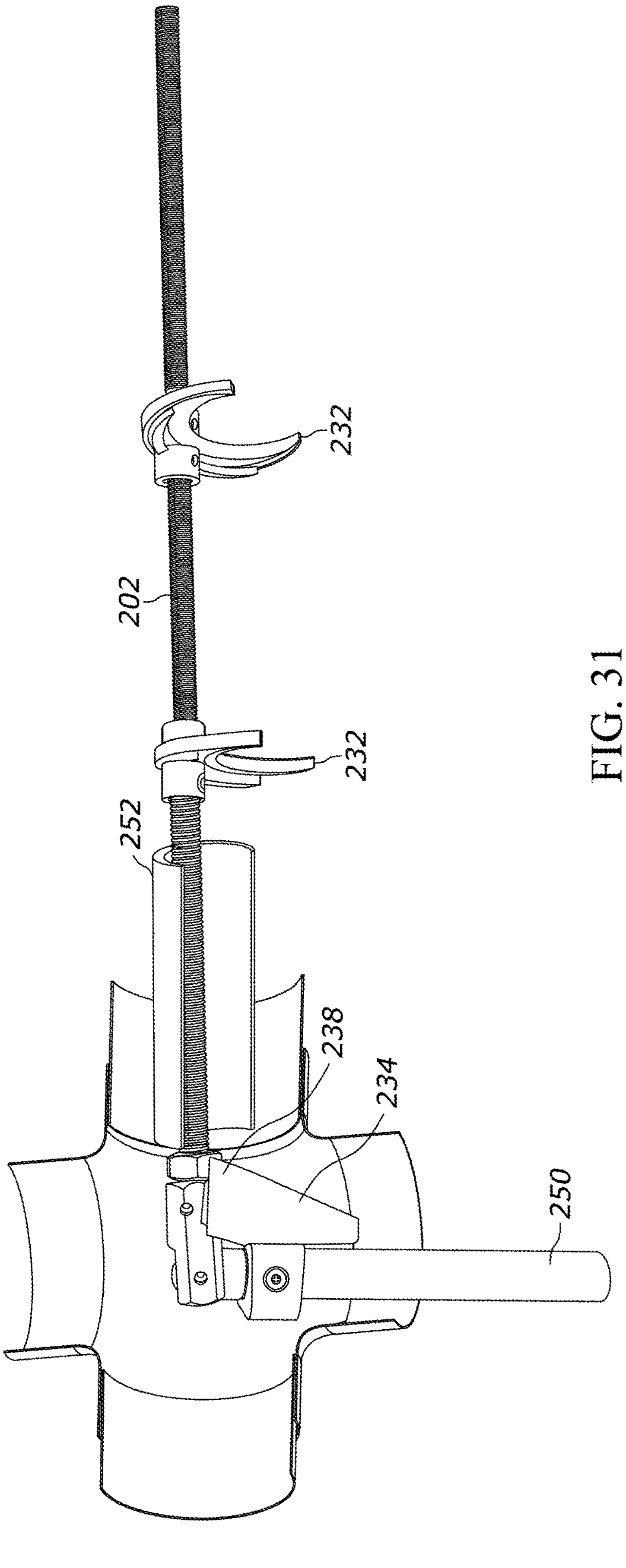
FIG. 31 depicts a side view of the pipe rodding guide tool of FIG. 24, with the pipe rodding guide tool interacting with a pipe junction and a portion of the pipe removed to show the interaction of the pipe rodding guide tool and pipe junction.

In the preferred embodiment, the flashlight 220 is fixedly attached to the rod 202 proximate the underside of the cover 252 as shown in FIG. 28. The flashlight 220 may be affixed to the rod 202 by use of an adhesive, welding, heat treatment or alternative means that are known to a person of ordinary skill in the art. In an embodiment, the frame of the flashlight 220 and rod 202 are molded from a single piece of material.

In another alternative embodiment, the flashlight 220 is removably attached to the rod 202 proximate the underside of the cover 252. In one such embodiment, the rod 202, proximate the underside of the cover 252, includes flexible extensions which attach to the flashlight 220 by connecting to the sides of the flashlight 220. In this embodiment, the flashlight 220 is removably attached to the rod 202 by application of force. In alternative embodiments, the rod 202 and flashlight 220 comprise alternative mechanisms which are clear to a person of ordinary skill in the art.

In an embodiment, the rod 202, cover 252, and flashlight 220 compartment are molded from a single piece of material, such as a plastic, plastic resin, metal, composite, other similarly situated material, or a combination thereof.

Grasping Device

Figure 34:
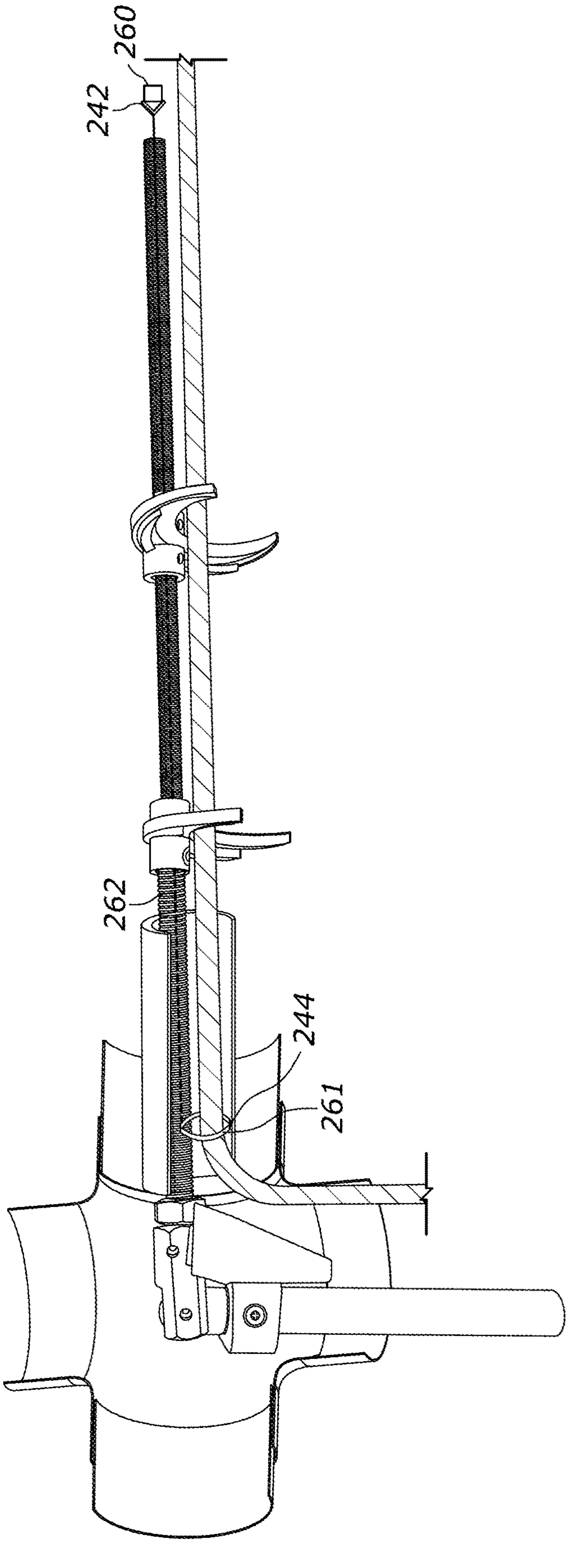
FIG. 34 depicts a side view of the pipe rodding guide tool in FIG. 24, (which includes a grasping mechanism to grab a rodding cable) with the pipe rodding guide tool inserted in a pipe junction, a portion of which is removed to show the interaction of the pipe rodding guide tool and pipe junction.

As shown in FIG. 34, the rod 202 may comprise a grasping device 244 proximate the underside of the cover 252. The grasping device 244 is comprised of a mechanism capable of opening and closing around an object (such as the flexible rod, snake, or rodding cable). The operation of the grasping device 244 is controlled by the grip 242.

The grasping device 244 is comprised of plastic, plastic resin, metal, composite, other similarly situated material, or combination thereof.

The grasping device 244 comprises the grip 242, a trigger mechanism 260 (located on or near the grip 242), an elongated body 262, two arms 261 connected to the elongated body 262, and an actuator means. The arms 261 are connected to the elongated body 262 by fastening means. Attached to the arms 261 is the actuator means which, when activated by the trigger mechanism 260 cause the arms to move between an open and closed position.

In the preferred embodiment, the grasping mechanism is in an open position until the trigger is activated. The grasping mechanism returns to its open position once the trigger 260 is no longer activated. When the grasping mechanism 244 is in an open position, the ends of the arms 261 are spaced apart. When the grasping mechanism 244 is in a closed position, the ends of the arms 261 are proximate one another and at least partially surround an object, such as the rodding cable.

In an embodiment, the trigger mechanism is activated by compressing the grip 242. In another embodiment, the trigger mechanism 260 is activated by pressing a button located on the grip 242. In further alternative embodiments, the trigger mechanism 260 is activated by other methods known to a person of ordinary skill in the art.

In an embodiment, the rod 202, cover 252, and grasping mechanism are comprised of the same material such as plastic, plastic resin, metal, composites, or other similarly situated material.

In the embodiment described, the fastening means connecting the arms 261 to the elongated body 262 may comprise rivets, welding, glue, reinforcing plates, or other similar fastening methods known to a person of ordinary skill in the art. Similarly, actuator means are known to a person of ordinary skill in the art, and comprise methods and devices used to move the spaced apart ends of two arms to be proximate each other.

Use of the Pipe Rodding Guide Tool

The pipe rodding guide tool 100, 200 in the engaged position is configured to enter a pipe near a junction and form a path for a flexible rod/snake to travel along a desired route.

The deflector 104, 204 of the pipe rodding guide tool 100, 200 is inserted into a plumbing system or pipe in the resting position. The tool 100, 200 is oriented upon insertion such that the hinge 106, 206 is turned toward the junction of interest (i.e., such that when bent, the hinge 106, 206 will flex into the desired junction). As shown, this can be accomplished by aligning the guide component(s) 132, 232 such that the crescents face toward the desired junction.

Once the tool has been inserted in the desired orientation, the user moves the pipe rodding guide tool 100, 200 along the plumbing system or pipe until it reaches the desired pipe junction. At the pipe junction, the user angles the rod 102, 202 away from the desired direction of travel, such that at least a portion of the rod 102, 202 touches or is near the portion of pipe wall which is opposite the desired direction of travel. At the pipe junction, the user presses the end of the body 134, 234 (or extended portion 250) against the wall of the pipe junction in the desired direction of travel. The application of force bends the deflector 104, 204 at the hinge 106, 206 to point the deflector 104, 206 and body 134, 234 in the desired direction of travel (i.e., down the desired junction).

As stated above, the pipe rodding guide tool 100, 200 in the fully engaged position provides a deflector 104, 204 with an arcuate-shaped body 134 (or cylindrical shaped body 234) which is used to guide a snake in a selected direction of a pipe junction. Once the pipe rodding guide tool 100, 200 is in the engaged position, a user can direct a flexible rod/snake to travel through the guide components 132, 232 and along the body 134, 234 by the desired route of travel.

The deflector 104, 204 further comprises a guide wall 138, 238 to ensure that the snake is directed along the desired path and in the direction of the body 134, 234. When the pipe rodding guide tool 100, 200 is in a fully engaged position, the guide wall 138, 238 is proximate the hinge 106, 206 and effectively provides a "seal" to prevent a snake from passing around or above the body 134, 234 of the deflector 104, 204.

In one particular method of use, the hinge 106, 206 will bend due to the gravitational pull on the body 134, 234 (or extended portion 250). In such method of use, a user would insert the pipe rodding guide tool 100, 200 such that the crescents of the guide component(s) 132, 232 face in a downward position. The positioning of the guide component (s) 132, 232 will ensure that the hinge 106, 206 is proximate the top of the pipe while the user moves the pipe rodding guide tool 100, 200 through the pipe. The weight of the body 134, 234 (or extended portion 250) will cause the hinge 106, 206 to partially bend such that the end of the body 134, 234 will slide along the bottom of the pipe and drop into the desired opening of the pipe junction. Once the body 134, 234 enters the desired pipe junction, the user moves the pipe rodding guide tool 100, 200 into the engaged position, such that the body 134, 234 rests against or proximate the back of the wall of the desired pipe junction to stop the pipe guide rodding tool 100 in place and bend the hinge 106, 206 to form a desired angle which can guide the snake down the desired direction of travel.

In an alternative method of use, a grip 142, 242 provides a means to alternate the deflector 104, 204 between its resting and engaged position. In this alternative embodiment, the grip 142, 242 comprises a trigger mechanism 260. When the trigger mechanism 260 is activated, the deflector 104, 204 moves to the engaged position, whereas when the trigger mechanism 260 is not activated, the deflector 104, 204 moves to the resting position. In such method of use, the user would insert the tool 100, 200 such that the crescents of the guide component 132, 232 face in a downward position. The user moves the tool 100, 200 toward the desired pipe junction and activates the trigger mechanism 260 to cause the deflector 104, 204 to bend at the hinge 106, 206 and enter the desired pipe junction, thereby forming an angle which can guide the snake down the desired direction of travel.

In alternative methods of use, an operator who may not know exactly where the pipe junction is may operate the pipe rodding guide tool 100, 200 to direct a snake in other directions. A user is able to feel the hinge 106, 206 enter into a pipe junction or feel a portion of the guide component(s) 132, 232 make contact with a pipe junction. Once the user locates the pipe junction, he or she can angle the rod 102, 202 and body 134, 234 to enter a desired direction at the pipe junction.

The tool of the present disclosure is also capable of use with more complicated pipe systems. For example, where multiple junctions exist with pipe segments extending in the same direction (e.g., T junctions in series, both resulting in pipe segments extending downward at 90 degree angles to the initial pipe segment), the pipe rodding guide tool 100, 200 can be used to selectively clean either of the first or second junctions. For the first junction, the method proceeds as described above. To selectively clean the second junction, the tool is initially inserted in an upside down orientation (i.e., such that it is oriented in a manner to clean an upward pipe junction). The pipe rodding guide tool 100, 200 is then moved through the pipe until the deflector 104, 204 is past the first downward junction before being rotated into the orientation described above to clean the second junction.

After the snake is directed to the desired route, the user may remove the pipe rodding guide tool 100, 200 from the plumbing system or pipe and use the snake to clean blockages in the pipe without the need for the pipe rodding guide tool 100, 200.

Once the pipe rodding guide tool 100, 200 is in the desired position, a user can secure the pipe rodding guide tool 100, 200 to the pipe with the fastener 128, 228 and clip attachment 130, 230 by attaching the fastener 128, 228 directly to the pipe. Even while the tool 100, 200 is attached to the pipe via the clip attachment 130, 230 a user may continue to slide the tool back and/or forth because the clip attachment 130, 230 slidably attaches to the rod 102, 202. Once the pipe rodding guide tool 100, 200 is in the desired position, a user can fixedly secure the clip attachment 130, 230 to the rod 102, 202 to limit further movement of the rod 102, 202.

After the snake is directed to the desired route, the user may remove the pipe rodding guide tool 100, 200 from the plumbing system or pipe and use the snake to clean blockages in the pipe without the need for the pipe rodding guide tool 100, 200.

In the embodiment shown in FIGS. 22 and 34, the pipe rodding guide tool 100, 200 is in an engaged position and forms a path for a flexible rod/snake/rodding cable to travel along a desired route. Here, a user would use the grasping mechanism 144, 244 to grab the rodding cable prior to inserting the pipe rodding guide tool 100, 200 into a pipe. The user would use the pipe rodding guide tool 100, 200 to guide the rodding cable to the desired route and release the rodding cable from the pipe rodding guide tool 100, 200. The user may then remove the tool from the plumbing system or pipe and use the rodding cable to clean blockages in the pipe without the need for the tool.

The foregoing examples have been provided merely for the purpose of explanation, and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the field would be able to conceive of a wide variety of alternative configurations and successful combinations thereof. The selection of these and other details of construction are believed to be well within the ability of one of even rudimental skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments. All technical terms shall take on their customary meaning as established by the appropriate technical discipline utilized by those normally skilled in that particular art area.

What is claimed is:

1. A pipe rodding guide tool to guide a snake along a path, the pipe rodding guide tool comprising:
an extendable rod having a first end and a second end, the second end comprising a handle, the extendable rod further comprising:
a hinged portion extending from the first end of the extendable rod, the hinged portion including a passageway extending therethrough;
an interior rod complimentarily configured within an exterior housing;
wherein an exterior surface of the interior rod is contiguously disposed with an interior wall of the exterior housing; and
wherein the interior rod is slidably connected and extendable from the exterior housing; and
a deflector rotatably connected to the hinged portion of the extendable rod via a hinge, the deflector having an engaging portion and a body extending therefrom;
wherein the deflector is configured to rotate between an engaged position whereby the deflector and extendable rod are bent along the hinge such that the deflector and extendable rod form a curved pathway and a disengaged position whereby the deflector and extendable rod are axially aligned such that the deflector and extendable rod do not form a curved pathway;
wherein the engaging portion of the deflector comprises a pair of spaced apart arms detachably interlocked with the hinged portion of the extendable rod to form the hinge; and
wherein the deflector is configured to freely rotate about the hinge by force of gravity;
wherein the body of the deflector extends away from the hinge and comprises a concave inner surface and a convex outer surface such that when the deflector is in the disengaged position, the convex outer surface and concave inner surface point in opposing directions which are perpendicular to the center axis of the rod and when the deflector is in the engaged position, the convex outer surface and convex inner surface point in opposing directions which are parallel to the center axis of the rod.

2. The pipe rodding guide tool of claim 1, wherein the deflector further comprises:
a lip to restrict rotation of the deflector along the hinge; and
a guide wall extending from an edge of the body toward the hinge to direct the snake toward the body.

3. The pipe rodding guide tool of claim 2, wherein the spaced apart arms comprise a through hole which is aligned in registration with the passageway and a fastener connects the engaging portion of the deflector to the hinged portion of the extendable rod.

4. The pipe rodding guide tool of claim 2, wherein the arms of the engaging portion of the deflector comprise grooves which are aligned in registration with the passageway of the hinged portion to directly connect the engaging portion of the deflector to the hinged portion of the extendable rod.

5. The pipe rodding guide tool of claim 1, wherein a handle is connected to the interior rod and forms the second end of the extendable rod.

6. The pipe rodding guide tool of claim 1, wherein the outer housing further comprises a flashlight and battery compartment disposed along an underside of the rod and proximate the hinge.

7. The pipe rodding guide tool of claim 1, wherein the extendable rod and hinged portion are comprised of an integral piece of material.

8. The pipe rodding guide tool of claim 1, further comprising a fastener slidably connected to the rod configured to detachably connect the rod to a pipe.

9. The pipe rodding guide tool of claim 1, wherein the extendable rod is in an extended position when the interior rod is at least partially extended from the exterior housing.

10. The pipe rodding guide tool of claim 1, wherein the extendable rod is in a retracted position when the ends of the exterior housing and interior rod are proximate one another.

11. The pipe rodding guide tool of claim 1, wherein when the deflector is in the engaged position the deflector and extendable rod are configured such that the snake contacts the concave inner surface of the deflector and the snake is guided in a downward direction.

12. The pipe rodding guide tool of claim 11, wherein the deflector approximately forms a 90 degree angle with the extendable rod.

13. The pipe rodding guide tool of claim 1, wherein when the deflector is in the disengaged position, an upward force is applied to the deflector when it is the deflector and the extendable rod are not bent along the hinge.

14. A method of using a pipe rodding guide tool, comprising the steps of:
inserting the pipe guide rodding tool into a pipe, the pipe rodding guide tool comprising:
an extendable rod having a first end and a second end, the second end comprising a handle, the extendable rod further comprising:
a hinged portion extending from the first end of the extendable rod, the hinged portion including a passageway extending therethrough;
an interior rod complimentarily configured within an exterior housing;
wherein an exterior surface of the interior rod is contiguously disposed with an interior wall of the exterior housing; and
wherein the interior rod is slidably connected and extendable from the exterior housing; and
a deflector rotatably connected to the hinged portion of the extendable rod via a hinge, the deflector having an engaging portion and a body extending therefrom;
wherein the deflector is configured to rotate between an engaged position whereby the deflector and extendable rod are bent along the hinge to form a curved pathway for the snake to traverse and a disengaged position whereby the deflector and extendable rod are aligned for the snake to traverse a level pathway;
wherein the engaging portion of the deflector comprises a pair of spaced apart arms detachably interlocked with the hinged portion of the extendable rod to form the hinge;
wherein the deflector is configured to freely rotate about the hinge by force of gravity;
wherein the body of the deflector extends away from the hinge and comprises a concave inner surface and a convex outer surface such that when the deflector is in the disengaged position, the concave inner surface points in a downward direction;
moving the deflector toward a junction in the pipe;
positioning the deflector toward a desired direction at the junction in the pipe;

bending the deflector along the hinge of the extendable rod such that the deflector points in a desired direction and forms a path for a flexible rod or snake to travel; and inserting the snake into the pipe along the path created by the pipe rodding guide tool.

15. The method of claim 14, wherein the pipe rodding guide tool is bent along the hinge by gravity to position the deflector in the desired direction.

16. The method of claim 14, comprising the additional step of applying a fastener to the extendable rod to secure the extendable rod to the pipe.

* * * * *